United States Patent
Yoshinori et al.

(10) Patent No.: US 6,491,578 B2
(45) Date of Patent: Dec. 10, 2002

(54) VEHICLE AIR CONDITIONER HAVING AIR SUCTION PORT FOR EACH SEAT

(75) Inventors: Takeshi Yoshinori, Okazaki (JP); Kouji Sakai, Kariya (JP); Shinji Aoki, Chiryu (JP); Yuichi Kajino, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/820,245

(22) Filed: Mar. 28, 2001

(65) Prior Publication Data

US 2001/0029162 A1 Oct. 11, 2001

(30) Foreign Application Priority Data

Mar. 31, 2000 (JP) .................................... 2000-096307
Oct. 17, 2000 (JP) .................................... 2000-317080

(51) Int. Cl.⁷ ................................................ B60H 1/00
(52) U.S. Cl. ...................... 454/139; 165/203; 454/100; 454/140
(58) Field of Search .......................... 454/77, 99, 100, 454/134, 140; 165/203, 204, 42, 43

(56) References Cited

U.S. PATENT DOCUMENTS

| | | | | |
|---|---|---|---|---|
| 2,203,814 A | * | 6/1940 | Clements | 165/42 |
| 2,212,897 A | * | 8/1940 | Crawford et al. | 454/87 |
| 2,383,423 A | * | 8/1945 | Steins | 454/158 |
| 2,526,560 A | * | 10/1950 | Hans | 237/12.3 A |
| 5,439,415 A | * | 8/1995 | Hirikawa et al. | 454/105 |
| 5,878,809 A | * | 3/1999 | Heinle | 165/203 |
| 6,019,288 A | * | 2/2000 | Arold et al. | 165/204 |

FOREIGN PATENT DOCUMENTS

| | | | |
|---|---|---|---|
| EP | 0 503 987 | * | 9/1992 |
| JP | A10-6744 | | 1/1998 |

* cited by examiner

Primary Examiner—Harold Joyce
(74) Attorney, Agent, or Firm—Harness, Dickey & Pierce, PLC

(57) ABSTRACT

In a vehicle air conditioner, each of cool air outlets is provided at an upper side of each seat at second and third seat lines from a most front seat so that cool air from an air conditioning unit is blown from the cool air outlets toward upper sides of the seats, respectively, and each of warm air outlets is provided at a lower side of each seat at the second and third seat lines so that warm air from the air conditioning unit is blown from the warm air outlets toward lower sides of the seats, respectively. In addition, each of suction ports is provided for each corresponding seat at the second and third seat lines so that air inside a passenger compartment is sucked from the suction ports to be returned to the air conditioning unit.

37 Claims, 13 Drawing Sheets

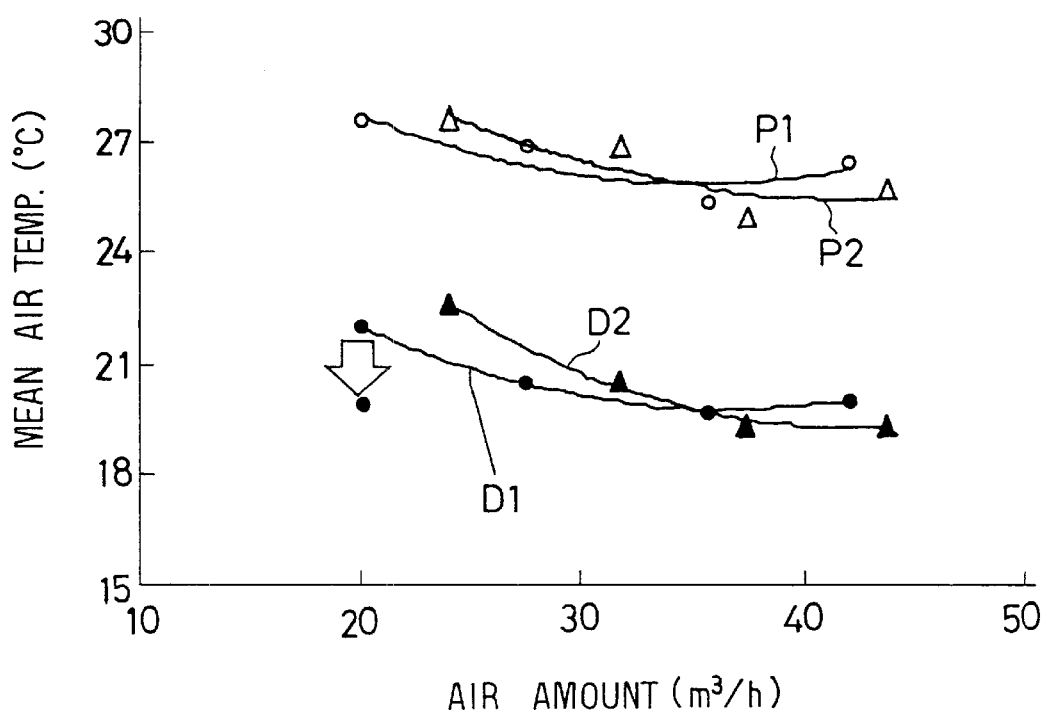
FIG. 11
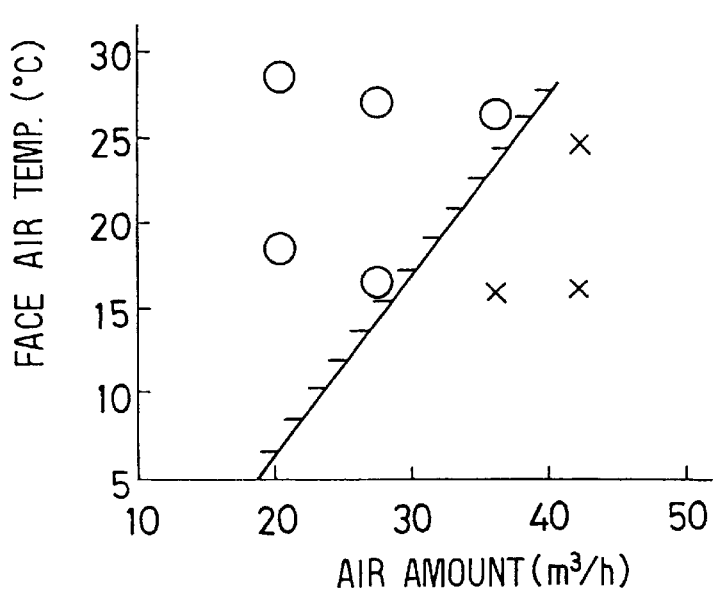
FIG. 12  ○ FAVORABLE  × UNFAVORABLE

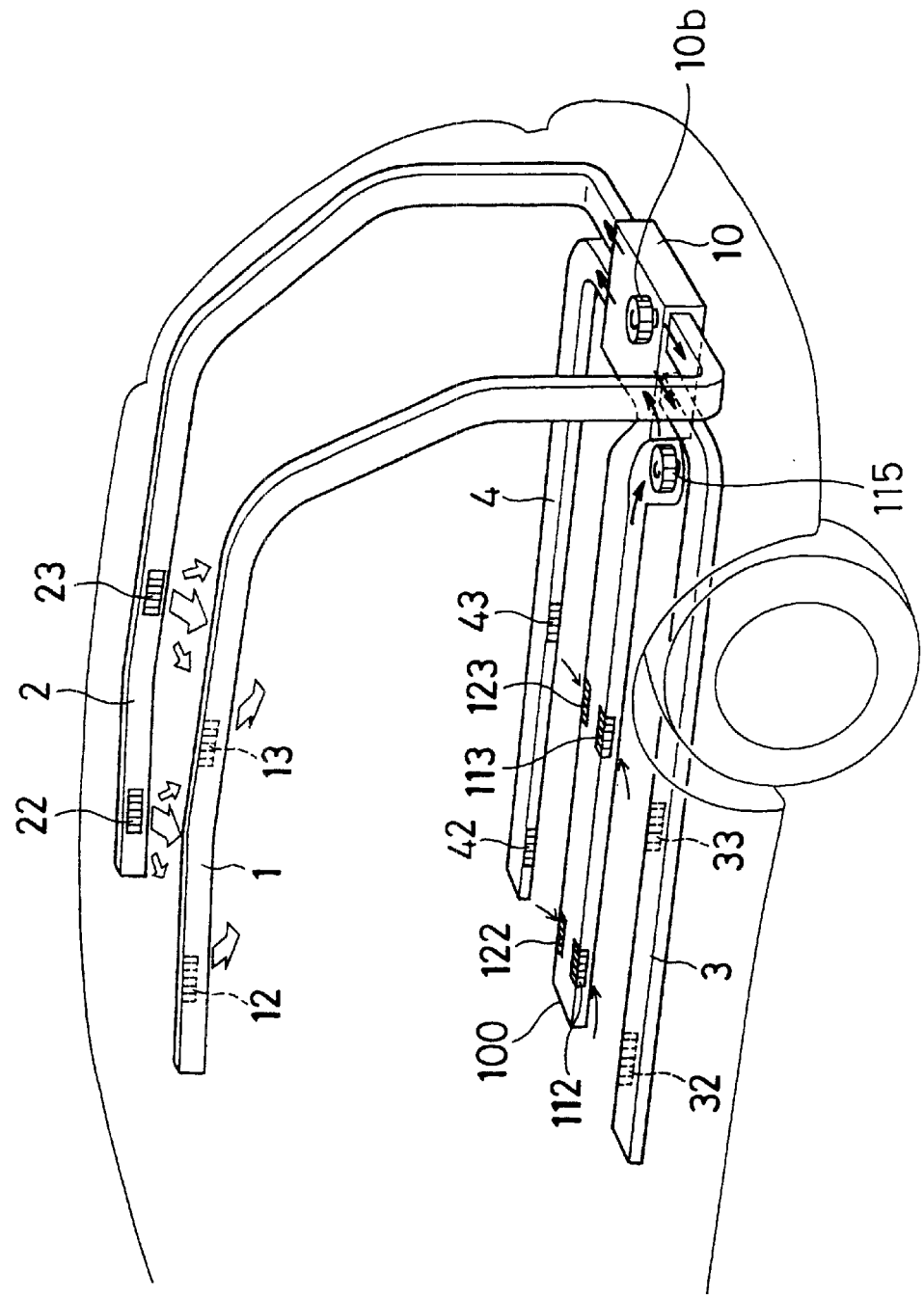

VEHICLE AIR CONDITIONER HAVING AIR SUCTION PORT FOR EACH SEAT

CROSS-REFERENCE TO RELATED APPLICATION

This application is related to Japanese Patent Applications No. 2000-96307 filed on Mar. 31, 2000, and No. 2000-317080 filed on Oct. 17, 2000.

BACKGROUND OF THE INVENTION

1. Field of the Invention

The present invention relates to a vehicle air conditioner having inside air suction ports each of which is provided for each seat in a passenger compartment. More particularly, a forced suction blower is disposed at a downstream side of the inside air suction ports to forcibly suck inside air of the passenger compartment from the inside air suction ports in the vehicle air conditioner.

2. Description of Related Art

In a conventional vehicle air conditioner described in JP-A-10-6744, a rear air conditioning unit for heating or cooling a rear seat side within a passenger compartment is provided. Further, a suction port, from which air inside the passenger compartment is sucked, is provided in one of right and left rear side panels, and an air outlet, from which conditioned air of the rear air conditioning unit is blown toward the rear seat side of the passenger compartment, is provided in the other one of the right and left rear side panels. In this case, because air flows in the rear space of the passenger compartment between the right and left sides, a uniform air temperature distribution can be obtained in right and left sides on the rear seat of the passenger compartment. However, when a heat load (e.g., air amount, air temperature) at the rear right side is different from that at the rear left side, it is difficult to perform an independent air-conditioning control.

Further, in a vehicle air conditioner, only a single suction port for sucking inside air inside the passenger compartment into a rear air conditioning unit is provided, while plural cool air outlets and plural warm air outlets are provided. Therefore, when the single suction port is provided in the side panel adjacent to the third seat from a most front seat, for example, air blown toward the second seat readily flows into the third seat side. Accordingly, air cannot be sufficiently distributed to the second seat side, and an independent air-conditioning control for each seat is deteriorated.

Further, in a vehicle having a large seat movable range, when a passenger on the rear seat is placed at a position apart from a rear air outlet, it is necessary to increase an air amount blown from the air outlet. Accordingly, consumed power for performing air-conditioning operation is increased, and air-blowing noise is increased.

SUMMARY OF THE INVENTION

In view of the foregoing problems, it is an object of the present invention to provide a vehicle air conditioner which effectively perform an air conditioning operation desired by a passenger on each seat.

It is an another object of the present invention to provide a vehicle air conditioner which improves an independent air-conditioning control performance in each seat without increasing an air-blowing amount from air outlets.

According to the present invention, in a vehicle air conditioner, each of plural suction ports is provided for each of plural seats so that air inside the passenger compartment is sucked from the suction ports to be introduced into an air passage of an air conditioning duct of an air conditioning unit, and each of outlets is provided for each air-conditioning space of the seats in the passenger compartment so that air from the air passage of the air conditioning duct is blown toward each air-conditioning space of the seats. Accordingly, a flow of conditioned air blown toward a passenger on each seat can be effectively distributed in each seat, air-conditioning operation desired by a passenger on each seat can be effectively performed. Thus, when the air conditioning unit is constructed to independently control an air state such as a suction air amount, an air-blowing amount, an air temperature and an air-flowing direction, the independent control of the air conditioning state can be effectively performed for each air conditioning space of the seats.

Preferably, a forced suction member, for forcibly sucking air inside the passenger compartment from the suction ports into the air passage of the air conditioning duct, is disposed separately from a blower of the air conditioning unit. Therefore, plural air conditioning spaces can be effectively independently provided in the seats, respectively, and independent air-conditioning control performance can be improved in each seat without increasing the air amount blown from the air outlets.

Preferably, a seat air duct, through which air from the air conditioning unit and air from the passenger compartment can be selectively introduced into each of the seats, can be provided, the seat air duct is disposed to be integrated with each of the seats, and the forced suction member is a seat blower which is disposed in the seat air duct so that air introduced into the seat air duct is blown from a seat surface. Accordingly, air sucked from the suction ports can be blown from the seat surface of each seat, while the independent air-conditioning control performance of each air conditioning space of the seats is improved.

More preferably, a blower control unit controls operation of a forced suction blower in accordance with one of each passenger's operation and a blower control characteristic, and the blower control unit controls an air amount sucked from each of the suction ports due to the operation of the forced suction blower in accordance with at least one of an air temperature and an air amount blown from an air outlet which is selected from a passenger's seated position. Therefore, an air amount sucked from each of the suction ports can be suitably set.

On the other hand, the blower control unit controls the air amount sucked from the suction ports to become larger than a predetermined amount in an air outlet mode where air is mainly blown toward an upper side of each seat, and the blower control unit controls the air amount sucked from the suction ports to become smaller than the predetermined amount in an air outlet mode where air is mainly blown toward a lower side of each seat. Therefore, air conditioning feeling for a passenger in each seat can be improved.

BRIEF DESCRIPTION OF THE DRAWINGS

Additional objects and advantages of the present invention will be more readily apparent from the following detailed description of preferred embodiments when taken together with the accompanying drawings, in which:

FIG. 11 is a graph showing a relationships between the mean temperature of air blown toward the upper body of a passenger and an air amount blown toward a front seat (first seat) of the passenger compartment, according to the fourth embodiment;

FIG. 12 is a graph showing a relationship between an air temperature blown toward the face of a passenger and an air amount blown toward the front seat of the passenger compartment, according to the fourth embodiment;

FIG. 14 is a perspective view showing plural rear air suction ports and plural rear air outlets for a rear air conditioning unit, according to a fifth preferred embodiment of the present invention;

DETAILED DESCRIPTION OF THE PRESENTLY PREFERRED EMBODIMENTS

Figure 1:
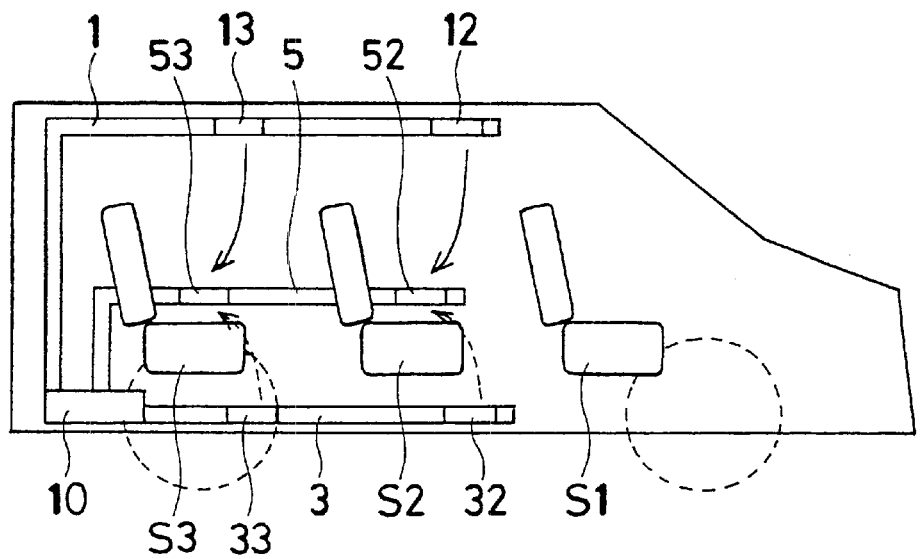
FIG. 1 is a schematic side view showing arrangement positions of plural rear air suction ports and plural rear air outlets for a rear air-conditioning unit, when being viewed from one side of vehicle, according to a first preferred embodiment of the present invention.

Preferred embodiments of the present invention will be described hereinafter with reference to the accompanying drawings.

A first preferred embodiment of the present invention will be now described with reference to FIGS. 1–6. In the first embodiment, a vehicle air conditioner includes a front air conditioning unit (not shown) for performing air-conditioning operation of a passenger on a first seat (i.e., front seat) S1 at the first line within a passenger compartment, a rear air conditioning unit 10 for performing air-conditioning operation for a passenger on a second seat (i.e., rear seat) at the second line within the passenger compartment and for a passenger at a third seat (i.e., rear seat) at the third line within the passenger compartment, and a control unit for controlling components of the front air conditioning unit and the rear air conditioning unit 10.

The front air conditioning unit includes a front air duct defining an air passage, a front blower generating an air flow in the air passage toward the passenger compartment, and a front control unit which independently controls air-conditioning states of the right and left front seats (first seat) of the passenger compartment.

In the first embodiment, for example, the rear air conditioning unit 10 is disposed on a floor at a rear side of the third seat S3 in the passenger compartment so that a seat slide operation or a passenger's movement is not affected by the arrangement of the rear air conditioning unit 10. The rear air conditioning unit 10 includes a rear air duct 10a defining an air passage, and at least one centrifugal blower 10b generating an air flow in the air passage toward the passenger compartment. That is, in the first embodiment, a single centrifugal blower or plural centrifugal blowers can be provided. The centrifugal blower 10b includes a scroll casing having a suction port, and a centrifugal fan disposed in the scroll casing. The centrifugal fan is rotated and driven by an actuator such as a blower motor.

The rear air conditioning unit 10 has a cooling heat exchanger 10c such as an evaporator, disposed at a downstream air side of the centrifugal blower 10b. The cooling heat exchanger 10c for cooling air is disposed at a downstream air side of the centrifugal blower 10b to cross an entire sectional area of the air passage within the air duct 10a. The air passage can be partitioned by a partition member 10f into a first passage for a left rear seat side, and a second passage for a right rear seat side. A heating heat exchanger 10d such as a heater core for heating air passing through the first and second passages using engine-cooling water as a heating source is disposed in the first and second passages at a downstream air side of the cooling heat exchanger 10c.

Further, a first air mixing door 10e, for adjusting temperature of air blown toward a left size air-conditioning zone in the passenger compartment, and a second air mixing door 10e, for adjusting temperature of air blown toward a right side air-conditioning zone, are rotatably attached to upstream air sides of the heating heat exchanger 10d, respectively. The first and second air mixing doors 10e adjust an air amount passing through the heating heat exchanger 10d and an air amount bypassing the heating heat exchanger 10d in each of the first and second passages so that temperature of air blown toward the right side air-conditioning zone and the left side air-conditioning zone of the passenger compartment can be independently adjusted. These first and second air mixing doors 10e are driven by an actuator such as a servomotor.

In the first embodiment, the first and second air passages are partitioned from each other by the partition member 10f provided in the air passage at a downstream air side of the cooling heat exchanger 10c. The heating heat exchanger 10d is disposed in the air passage to be positioned in both the first and second passages. Accordingly, the rear air conditioning unit 10 constructs a right-left independent air-conditioning control mechanism for independently controlling temperature of air blown toward the eight and left sides of each of the second and third seats S2, S3 (rear seat). In the first embodiment of the present invention, the rear air conditioning unit 10 can be constructed so that any one air-conditioning state such as the air temperature, an air outlet mode, an air amount blown into the passenger compartment and an air suction amount can be independently controlled between both the right side and left side of the second and third seats S2, S3. That is, the structure of the rear air conditioning unit 10 can be changed.

Figure 3:
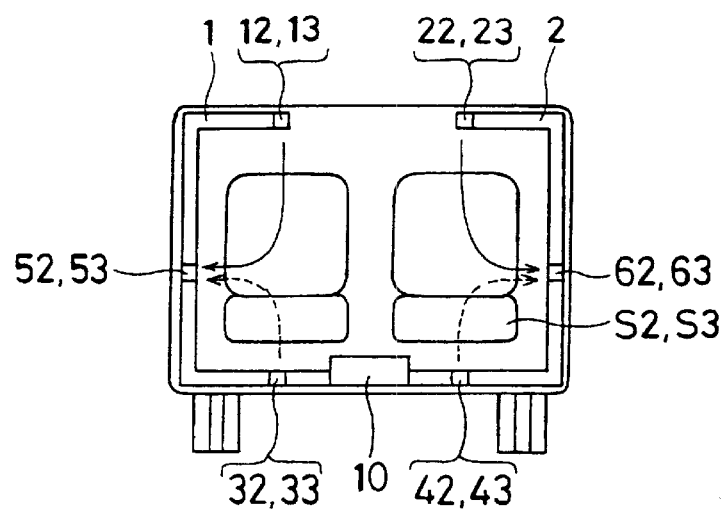
FIG. 3 is a schematic diagram showing the plural rear air suction ports and plural rear air outlets when being viewed from a vehicle rear side, according to the first embodiment.
Figure 4:
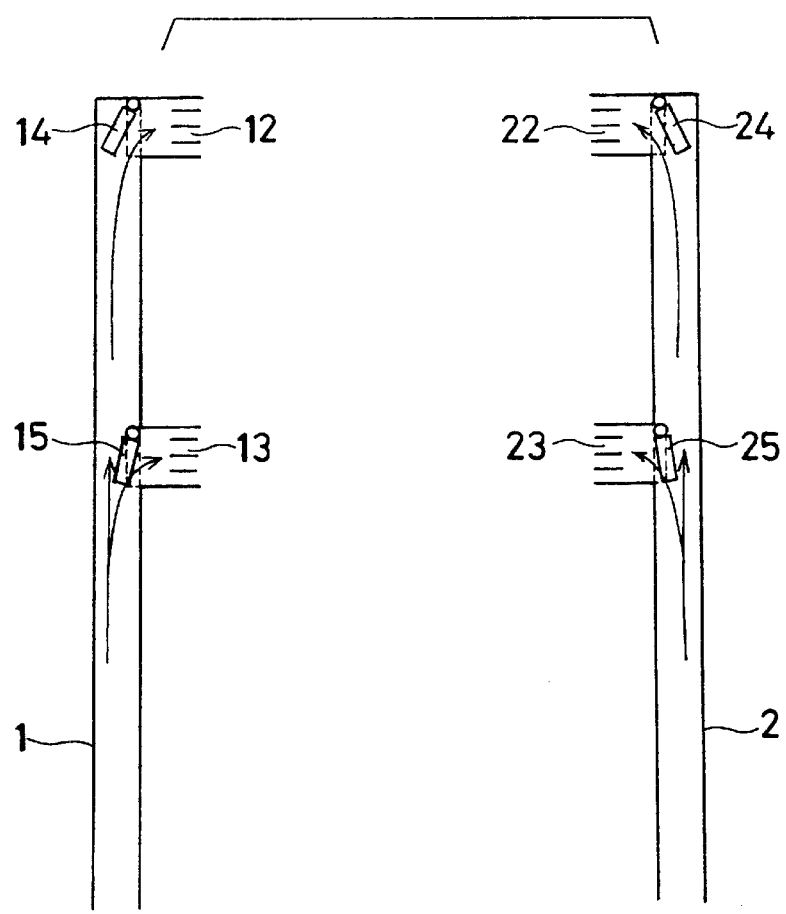
FIG. 4 is a view for explaining an air-amount adjustment mechanism for each rear seat of a right cool air duct and a left cool air duct, according to the first embodiment.

As shown in FIGS. 1, 3 and 4, left and right cool air ducts 1, 2, communicating with the first and second passages of the rear air conditioning unit 10 respectively, extend from the rear air conditioning unit 10 to a vehicle front side. The left and right cool air ducts 1, 2 are provided so that cool air is blown toward the upper side of a passenger seated on each right and left seats in each seat S2, S3 through the left and right cool air ducts 1, 2. Accordingly, the left and right cool air ducts 1, 2 are disposed to extend from the rear air conditioning unit 10 along the vehicle floor, a vehicle side panel, a vehicle pillar and a vehicle ceiling. As shown in FIG. 3, downstream parts of the left and right cool air ducts 1, 2 are disposed along the vehicle ceiling. Further, as shown in FIG. 4, cool air outlets 12, 22 for the left and right second seats S2 and cool air outlets 13, 23 for the left and right third seats S3 are provided in the downstream parts of the left and right cool air ducts 1, 2, respectively. Further, plural louvers which can change an air-blowing direction of conditioned air can be disposed in each of the cool air outlets 12, 22, 13, 23.

Further, air amount adjustment doors 14, 15, 24, 25 (air amount adjustment mechanism) are provided in the downstream parts of the cool air ducts 1, 2 to adjust an air amount blown from the cool air outlets 12, 13, 24, 25, respectively. Specifically, as shown in FIG. 4, the door 14 is disposed at an upstream air side of the left cool air outlet 12 for the left second seat S2, the door 24 is disposed at an upstream air side of the right cool air outlet 22 for the right second seat S2, the door 15 is disposed at an upstream air side of the left cool air outlet 13 for the left third seat S3, and the door 25 is disposed at an upstream air side of the right cool air outlet 23 for the right third seat S3. The doors 14, 15, 24, 25 are driven by an actuator such as a servomotor, for example.

Figure 5:
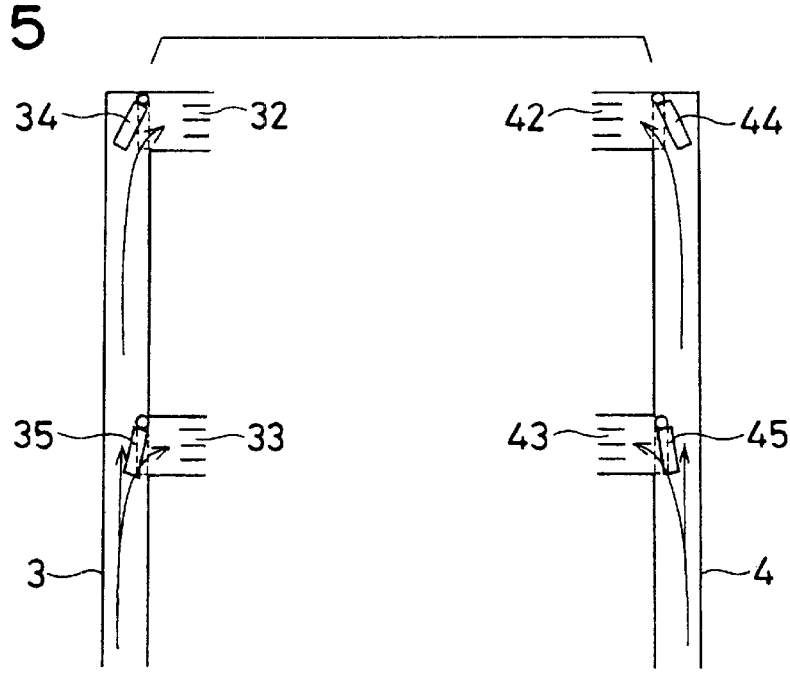
FIG. 5 is a view for explaining an air-amount adjustment mechanism for each rear seat of a right warm air duct and a left warm air duct, according to the first embodiment.

Further, as shown in FIGS. 1 and 5, left and right warm air ducts 3, 4, communicating with the first passage and the second passage of the rear air conditioning unit 10, respectively, are disposed to extend from the rear air conditioning unit 10 to the vehicle front side on the vehicle floor. The left and right warm air ducts 3, 4 are disposed to pass through lower sides of the seats S2, S3 on the vehicle floor so that warm air is blown toward the foot area of a passenger on each of the second and third seats S2, S3 through the left and right warm air ducts 3, 4.

Warm air outlets 32, 42 for the left and eight second seats S2 and warm air outlets 33, 43 for the left and right third seats S3 are provided in downstream parts of the left and right warm air ducts 3, 4, respectively. Specifically, the warm air outlet 32 from which air is blown toward the foot area of the left second seat S2 is provided in the left warm air duct 3, the warm air outlet 42 from which air is blown toward the foot area of the right second seat S2 is provided in the right warm air duct 4, the warm air outlet 33 from which air is blown toward the foot area of the left third seat S3 is provided in the left warm air duct 3, and the warm air outlet 43 from which air is blown toward the foot area of the right third seat S2 is provided in the right warm air duct 4. The warm air outlets 32, 33, 42 and 43 can be opened in the vehicle floor at positions corresponding to the left and right portions of each seat S2, S3. Plural louvers for changing an air-blowing direction of conditioned air may be provided in each of the warm air outlets 32, 33, 42, 43.

As shown in FIG. 5, air amount adjustment doors 34, 35, 42, 43 are provided in the downstream parts of the warm air ducts 3, 4 to adjust an air amount blown from the warm air outlets 32, 33, 42, 43, respectively. Specifically, as shown in FIG. 5, the door 34 is disposed at an upstream air side of the left warm air outlet 32 for the left second seat S2, the door 44 is disposed at an upstream air side of the right warm air outlet 42 for the right second seat S2, the door 35 is disposed at an upstream air side of the left warm air outlet 33 for the left third seat S3, and the door 45 is disposed at an upstream air side of the right warm air outlet 43 for the right third seat S3. The doors 34, 35, 44, 45 are driven by an actuator such as a servomotor, for example.

A switching door (not shown) is rotatably disposed at a downstream air side of the first passage of the rear air conditioning unit 10 to open and close a cool air passage within the left cool air duct 1 and a warm air passage within the left warm air duct 3. Further, a switching door (not shown) is rotatably disposed at a downstream air side of the second passage of the rear air conditioning unit 10 to open and close a cool air passage within the right cool air duct 2 and a warm air passage within the right warm air duct 4. The switching doors are driven by an actuator such as a servomotor using the switching doors, an air outlet mode such as a face mode, a foot mode and a bi-level mode can be set.

Figure 6:
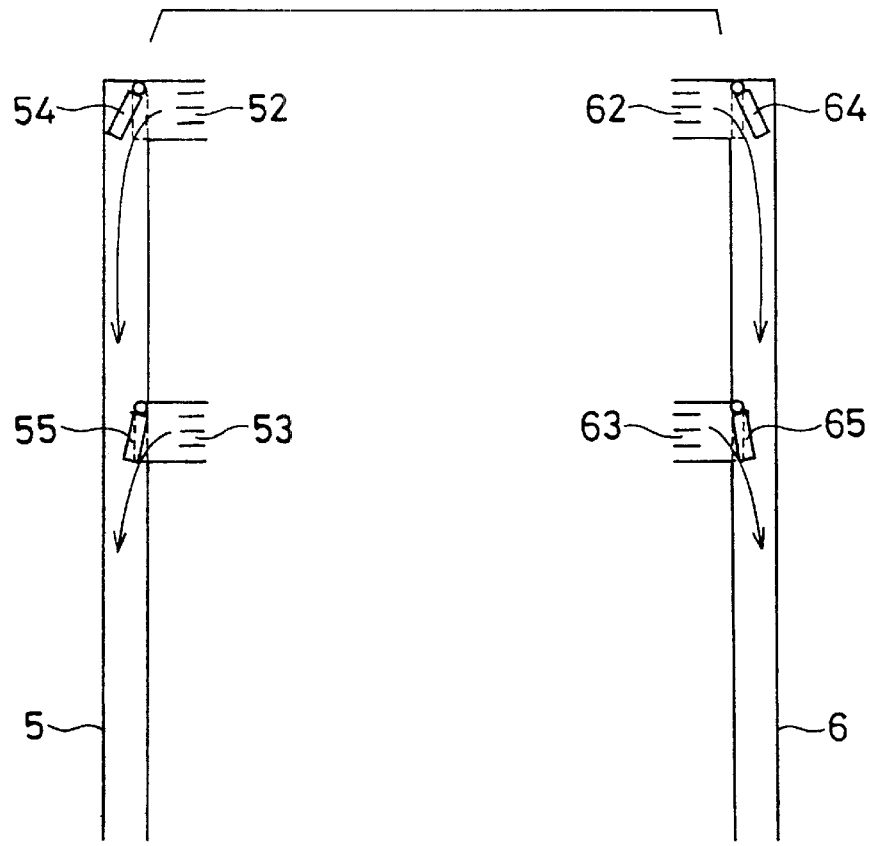
FIG. 6 is a view for explaining an air-amount adjustment mechanism for each rear seat of a right inside air suction duct and a left inside air suction duct, according to the first embodiment.

Further, as shown in FIGS. 1, 3 and 6, left and right inside air suction duct 5, 6, defining inside air suction passages, are disposed to extend from the rear air conditioning unit 10 toward the vehicle front side. The left and right inside air suction ducts 5, 6 are disposed between the left and right cool air ducts 1, 2 and the left and right warm air ducts 3, 4 in a vehicle up-down direction. The left and right inside air suction ducts 5, 6 are disposed to extend from the vehicle floor to the side panel so that inside air (cool air and warm air from outlets) of the passenger compartment is sucked into the left and right inside air suction ducts 5, 6. Inside air sucked into the inside air suction ducts 5, 6 can be introduced into a suction side of the blower 10b of the rear air conditioning unit 10.

As shown in FIG. 6, at the downstream parts of the left and right inside air suction ports 5, 6, suction ports 52, 62 corresponding to the left and right second seats S2 and suction ports 53, 63 corresponding to the left and right third seat S3 are provided, respectively. The suction ports 52, 62, 53, 63 are opened in the left and right side panel portions between the cool air outlets 12, 13, 22, 23 and the warm air outlets 32, 33, 42, 43 in the vehicle up-down direction. Specifically, the suction ports 52, 62, 53, 63 are opened in the side panel around the belly of a passenger seated on each seat S2, S3 of the passenger compartment.

Further, as shown in FIG. 6, air amount adjustment doors 54, 64 are disposed at upstream air sides of the suction ports 52, 62 for the left and right second seats S2, respectively, and air amount adjustment doors 55, 65 are disposed at upstream air sides of the suction ports 53, 63 for the left and right third seats S3, respectively. The air amount adjustment doors 54, 55, 64, 65 are driven by an actuator such as a servomotor. Accordingly, by adjusting each opening degree of the air amount adjustment doors 54, 55, 64, 65, the air suction amount sucked from each of the suction ports 52, 53, 62, 63 can be adjusted.

Next, operation of the vehicle air conditioner according to the first embodiment of the present invention will be now described with reference to FIGS. 1–6.

When a cooling operation for cooling the passenger compartment is set, the components of the rear air conditioner 10 are operated by the control unit in accordance with the cooling operation. During the cooling operation, the above-described left and right switching doors operate, so that the downstream sides of the first and second passages within the air conditioning unit 10 communicate with the cool air passages of the left and right cool air ducts 1, 2, respectively. Accordingly, cool air is introduced from the air passage within the air duct 10a of the rear air conditioning unit 10 to the left and right cool air ducts 1, 2. Cool air flowing into the left and right cool air ducts 1, 2 is blown toward the upper body of a passenger seated on each seat S2, S3 from the cool air outlets 12, 13, 22, 23.

The temperature of cool air blown into the left seat side and the right seat side of the passenger compartment can be independently adjusted by the air mixing doors 10e of the rear air conditioning unit 10. Specifically, left and right cooling loads of the rear seat sides of the passenger compartment are detected using sensors such as an inside air temperature sensor, an outside air temperature sensor and a sunlight amount sensor, and left and right target air temperatures (TAO) are respectively calculated based on the left and right cooling loads. The opening degrees of the air mixing doors 10e are adjusted based on the left and right target air temperatures so that the temperature of air blown toward the rear left seat side of the passenger compartment and the temperature of air blown toward the rear right seat side of the passenger compartment are respectively independently controlled.

On the other hand, inside air is sucked into the rear air conditioning unit 10 from the suction ports 52, 53, 62, 63 opened toward the belly of a passenger seated on each seat S2, S3. Accordingly, cool air blown from the cool air outlets 12, 13, 22, 23 flows toward the suction ports 52, 53, 62, 63 each of which is opened in the vehicle side panel at a position corresponding to the belly of the passenger seated on each of the left and right second seats S2 and the left and right third seats S3, and conditioned cool air is blown toward the upper body of the passenger on each seat S2, S3 of the passenger compartment.

For example, when the sunlight amount entering toward the left seat side is smaller than the right seat side in the second and third seats S2, S3, the air amount adjustment doors 14, 15 positioned at the upstream air sides of the left cool air outlets 12, 13 are controlled to close the left cool air outlets 12, 13. At this time, the suction ports 52, 53 of the left inside air suction duct 5, provided at the left sides of the second and third seats S2, S3, are closed by the air amount adjustment doors 54, 55, respectively.

Conversely, when the sunlight amount entering toward the left sides of the second and third seats S2, S3 becomes larger than that toward the right sides of the second and third seats S2, S3, the air amount adjustment doors 14, 15 operate to increase the opening degrees of the cool air outlets 12, 13 at the left sides of the second and third seats S2, S3. Accordingly, the air amount blown from the cool air outlets 12, 13 toward the left sides of the second and third seats S2, S3 is increased. At this time, the opening degrees of the suction ports 52, 53, provided at the left sides of the second and third seats S2, S3, are also increased by the air amount adjustment doors 54, 55, respectively.

When a heating operation for heating the rear seat side of the passenger compartment is set, the components of the rear air conditioning unit 10 are controlled by the control unit in accordance with the heating operation, and the above-described left and right switching doors operate. Therefore, the downstream sides of the first and second passages within the air conditioning unit 10 communicate with the warm air passages of the warm air ducts 3, 4, respectively. Accordingly, warm air is introduced from the air passage within the air duct 10a of the rear air conditioning unit 10 to the left and right warm air ducts 3, 4. Warm air flowing into the left and right warm air ducts 3, 4 is blown toward the foot area of a passenger seated on each seat S2, S3 from the warm air outlets 32, 33, 42, 43.

Similarly to the cooling operation, in the heating operation, the temperature of warm air blown into the left seat side and the right seat side of the passenger compartment can be independently adjusted by the air mixing doors 10e. Specifically, left and right heating loads of the rear seat sides of the passenger compartment are detected using the sensors such as the inside air temperature sensor, the outside air temperature sensor and the sunlight amount sensor, and left and right target air temperatures (TAO) are respectively calculated based on the left and right heating loads. The opening degrees of the air mixing doors 10e are adjusted based on the left and right target air temperatures (TAO) so that temperature of air blown toward the rear left seat side of the passenger compartment and the temperature of air blown toward the rear right seat side of the passenger compartment are respectively independently controlled using the air mixing doors 10e.

On the other hand, inside air of the passenger compartment is sucked into the rear air conditioning unit 10 through the suction ports 52, 53, 62, 63 opened toward the belly of a passenger seated on each seat S2, S3. Accordingly, warm air blown from the warm air outlets 32, 33, 42, 43 flows toward the suction ports 52, 53, 62, 63 opened in the vehicle side panel at a position corresponding to the belly of the passenger seated on the second and third seat S2, S3, and conditioned warm air is blown toward the lower body (foot area) of the passenger on each seat S2, S3 of the passenger compartment.

For example, when the sunlight amount entering toward the left seat side is larger than that entering toward the right seat side in the second and third seats S2, S3, and when it is unnecessary to blow warm air toward the left sides of the second and third seats S2, S3, the air amount adjustment doors 34, 35 positioned at the upstream air sides of the warm air outlets 32, 33 are controlled to close the warm air outlets 32, 33. At this time, the suction ports 52, 53, provided at the left sides of the second and third seats S2, S3, are closed by the air amount adjustment doors 54, 55, respectively. That is, the air suction amount from the left side suction ports 52, 53 of the second and third seats S2, S3 are adjusted in accordance with the warm air amount blown from the left warm air outlets 32, 33. Accordingly, an independent air conditioning space can be formed in each seat S2, S3.

Conversely, when the sunlight amount entering toward the left sides of the second and third seats S2, S3 becomes smaller than that toward the right sides of the second and third seats S2, S3, the air amount adjustment doors 34, 35 operate to increase the opening degrees of the warm air outlets 32, 33 on the left sides of the second and third seats S2, S3. Accordingly, the air amount blown from the warm air outlets 32, 33 toward the left sides of the second and third seats S2, S3 is increased. At this time, the opening degrees of the suction ports 52, 53, provided at the left sides of the second and third seats S2, S3, are also increased by the air amount adjustment doors 54, 55, respectively, in accordance with the increase of the air amount from the warm air outlets 32, 33.

In an intermediate operation, cool air is blown from the cool air outlets 12, 13, 22, 23 opened at upper sides of the head portion of a passenger seated on each seat S2, S3, warm air is blown from the warm air outlets 32, 33, 42, 43 opened at the foot portion of the passenger seated on each seat S2, S3, and inside air is sucked from the suction ports 52, 53, 62, 63 provided around the belly of the passenger seated on each seat S2, S3.

According to the first embodiment, because the suction ports 52, 53, 62, 63 are provided in the side panel corresponding to around the bell of the passenger seated on the seat S2, S3, warm air can be sufficiently supplied to the lower body of the passenger on the seat S2, S3, while cool air can be sufficiently supplied to the upper body of the passenger on the seat S2, S3. That is, an upper and lower double-flow of cool air and warm air can be provided, and pleasant feeling can be obtained. If the suction ports are provided at positions near the vehicle floor, warm air cannot flow upwardly, and cool air flows downwardly to the lower body of the passenger. Accordingly, in this case, unpleasant feeling may be given to the passenger.

According to the first embodiment of the present invention, the cool air outlets 12, 13, 22, 23, the warm air outlets 32, 33, 42, 43 and the suction ports 52, 53, 62, 63 are provided for the right and left sides of each seat S2, S3, so that suction of inside air of the passenger compartment is performed in accordance with right and left air-blowing states. Therefore, a cross flow of blown air between adjacent right and left seats and between the rear seats S2, S3 becomes smaller, and an independent air flow for each seat can be formed. Accordingly, a desired air conditioning state for a passenger can be effectively performed in each of right and left second seats S2 and right and left third seats S3, and an independent air conditioning can be obtained for each rear seat. As a result, in the first embodiment, the air conditioning state such as the suction air amount, the air-blowing amount, the air temperature, and the air blowing ratio can be adjusted for each rear seat.

According to the first embodiment of the present invention, because the air blowing amount of conditioned air and air suction amount of inside air can be adjusted at both right and left sides of each seat S2, S3, an independent air flow can be formed in each seat S2, S3. Accordingly, even when the sunlight is entered on the bias in the summer during the cooling operation, the upper side of the second and third seats S2, S3 can be effectively cooled in accordance with the sunlight amount entering into the passenger compartment. On the other hand, during the heating operation, the lower side of the second and third seats S2, S3 can be sufficiently heated. In addition, warm air blown from the warm air outlets 32, 33, 42, 43 corresponding to the right and left sides of the seats S2, S3 is sucked into the suction ports 52, 53, 62, 63 provided around the bell of the passenger. Accordingly, it is difficult to introduce warm air toward the upper side of the passenger, and it can prevent an unpleasant feeling from being given to the passenger.

In the first embodiment, when a passenger is not seated on one seat among the left and right second seats and the left and right third seats, the air amount adjustment door and the suction air amount adjustment door corresponding to the one seat can be closed. In this case, a blower voltage applied to the blower motor of the blower 10b can be reduced, and consumed power can be reduced.

Figure 7:
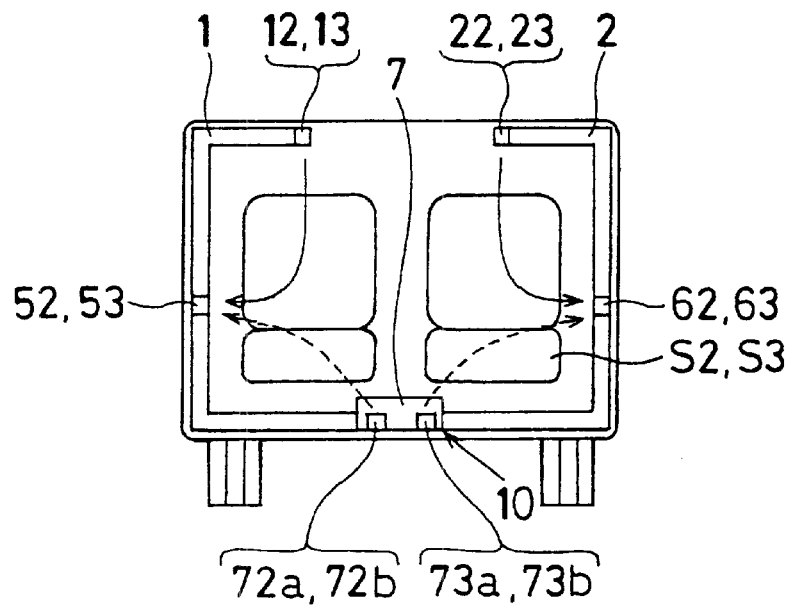
FIG. 7 is a schematic diagram showing plural rear air suction ports and plural rear air outlets for a rear air conditioning unit, when being viewed from a vehicle rear side, according to a second preferred embodiment of the present invention.

A second preferred embodiment of the present invention will be now described with reference to FIG. 7. FIG. 7 shows a main part of the rear air conditioning unit 10 when being viewed from a vehicle rear side. In the second embodiment, as shown in FIG. 7, a single warm air duct 7 for introducing warm air toward of the left side of the passenger on the seat S2, S3 is disposed at an approximate center in the vehicle width direction to extent to the vehicle front side from the rear air conditioning unit 10, and an a warm air passage within the warm air duct 7 is separated into two parts for right and left seat sides in each rear seat S2, S3. As shown in FIG. 7, warm air outlets 72a, 72b, 73a, 73b are provided in the warm air duct 7 at positions corresponding to the foot spaces of each second and third seats S2, S3. Therefore, warm air from the warm air outlets 72a, 72b mainly flows toward the suction ports 52, 53, respectively, and warm air from the warm air outlets 73a, 73b mainly flows toward the suction ports 62, 63, respectively, as shown in FIG. 7. That is, warm air flows from lower center portions toward side panel portions.

In the second embodiment, the cooling operation, the warm operation and the intermediate operation can be performed similarly to those of the above-described first embodiment. Further, in the second embodiment, the advantage similar to the above-described first embodiment can be obtained.

Figure 8:
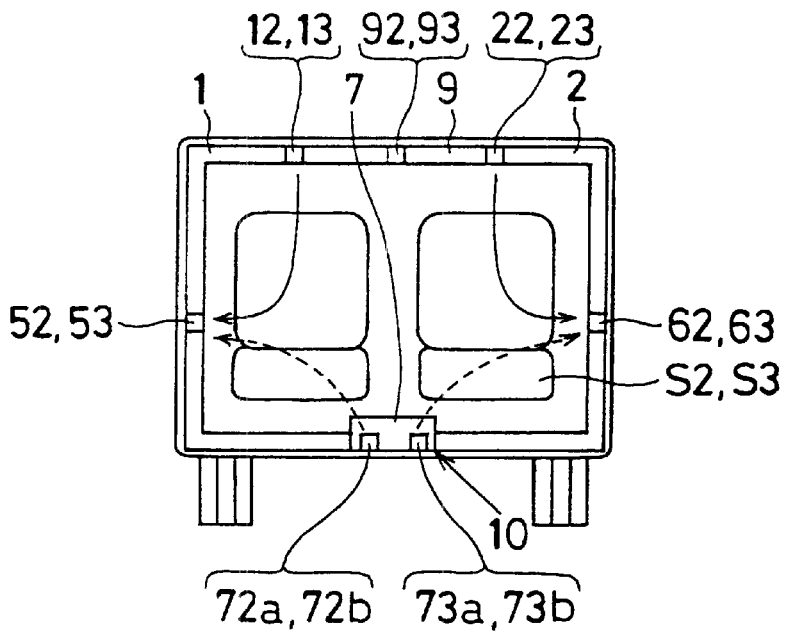
FIG. 8 is a schematic diagram showing plural rear air suction ports and plural rear air outlets for a rear air conditioning unit, when being viewed from a vehicle rear side, according to a third preferred embodiment of the present invention.

A third preferred embodiment of the present invention will be described with reference to FIG. 8. FIG. 8 shows a main part of the rear air conditioning unit 10 when being viewed from a vehicle rear side. In the third embodiment, as shown in FIG. 8, cool air outlets 92, 93 for the second and third seats S2, S3 are additionally provided at an approximate center of the vehicle ceiling in the vehicle width direction, as compared with the above-described second embodiment. That is, a cool air duct 9 is disposed to extend from the left and right cool air ducts 1, 2 in the vehicle width direction along the vehicle ceiling, and the cool air outlets 92, 93 are provided in the cool air duct 9 at positions corresponding to the second and third seats S2, S3.

In the third embodiment, the other pars are similar to those of the above-described first and second embodiments, and the advantage similar to that of the above-described first embodiment can be obtained.

A fourth preferred embodiment of the present invention will be now described with reference to FIGS. 9–13. A vehicle air conditioner of the fourth embodiment includes a front air conditioning unit (not shown) for performing air-conditioning operation of a passenger on a first seat (i.e., front seat) at the first line within the passenger compartment, a rear air conditioning unit 10 for performing air-conditioning operation of a passenger on a second seat (i.e., rear seat) at the second line within the passenger compartment and a passenger on a third seat (i.e., rear seat) at the third line within the passenger compartment, and a control unit (ECU) for controlling components of the front air conditioning unit and the rear air conditioning unit 10.

The front air conditioning unit includes a front air duct defining an air passage, a front blower generating an air flow in the air passage toward the passenger compartment, and a front control unit which independently controls air-conditioning states of the right and left front seats (first seat). At downstream air sides of the air passage of the front air duct, there are provided with right and left face outlets from which conditioned air (cool air) is blown toward the upper side of the right and left front seats (first seat), and right and left foot outlets from which conditioned air (warm air) is blown toward the lower side of the right and left front seats.

Figure 2:
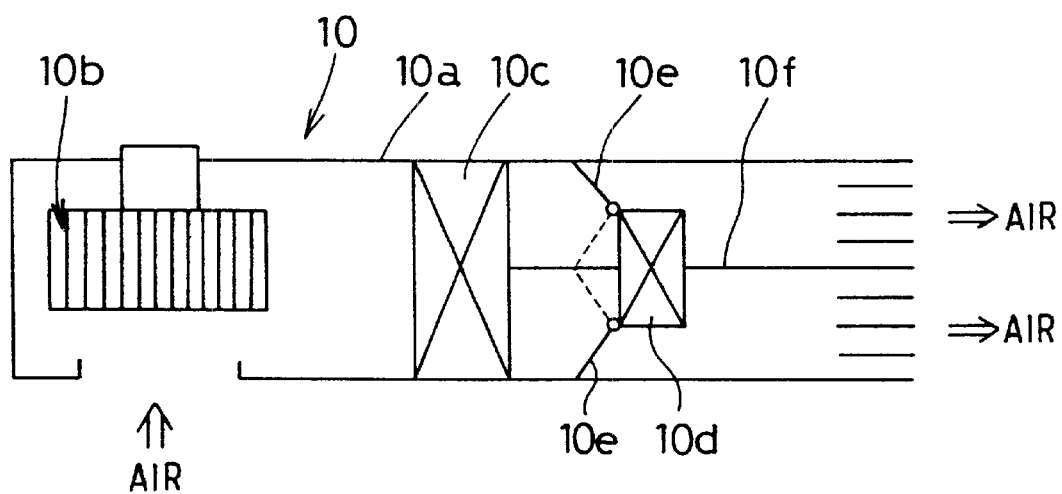
FIG. 2 is a schematic view showing the rear air-conditioning unit according to the first embodiment.
Figure 9:
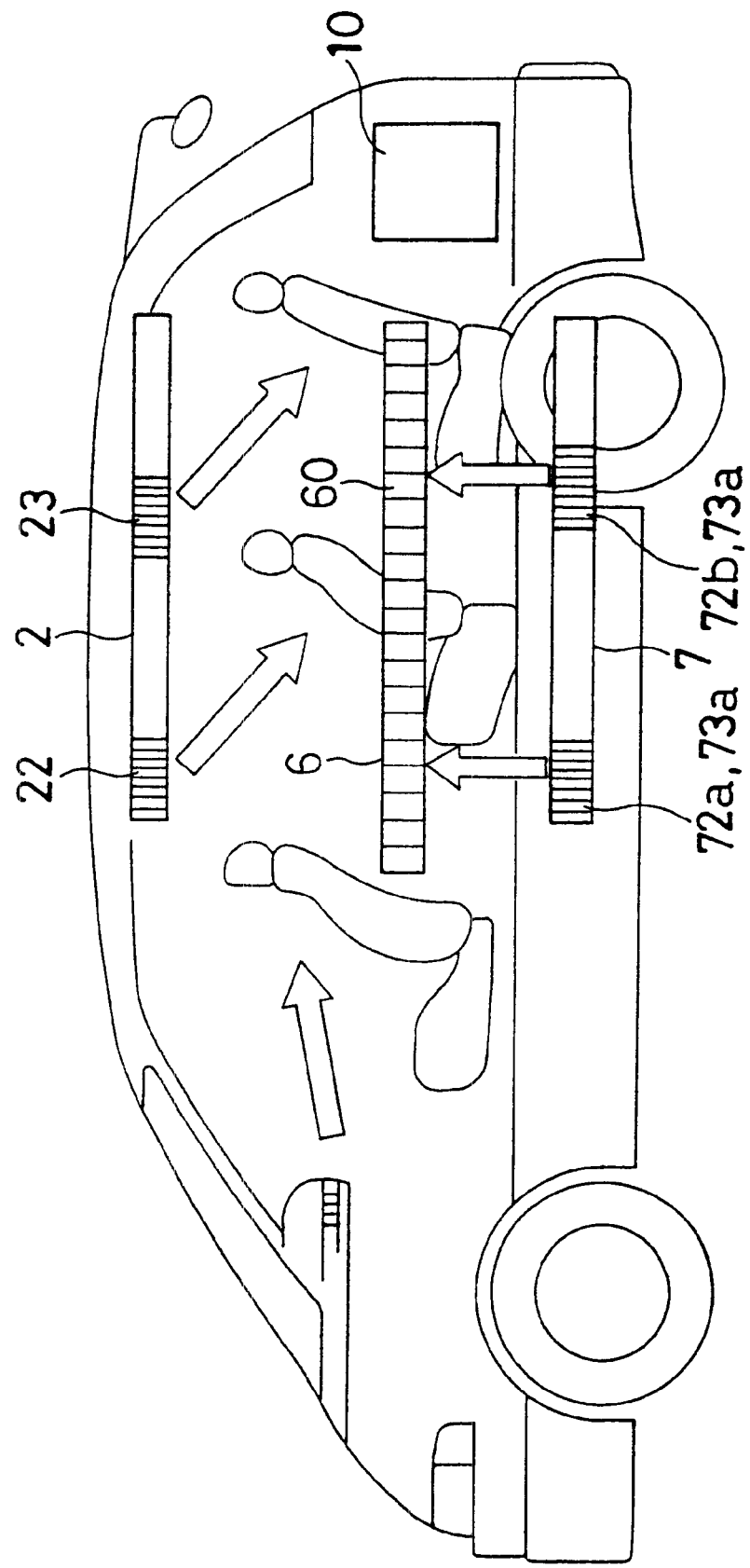
FIG. 9 is a schematic side view showing arrangement positions of plural rear air suction ports and plural rear air outlets for a rear air-conditioning unit, when being viewed from one side of a vehicle, according to a fourth preferred embodiment of the present invention.
Figure 10:
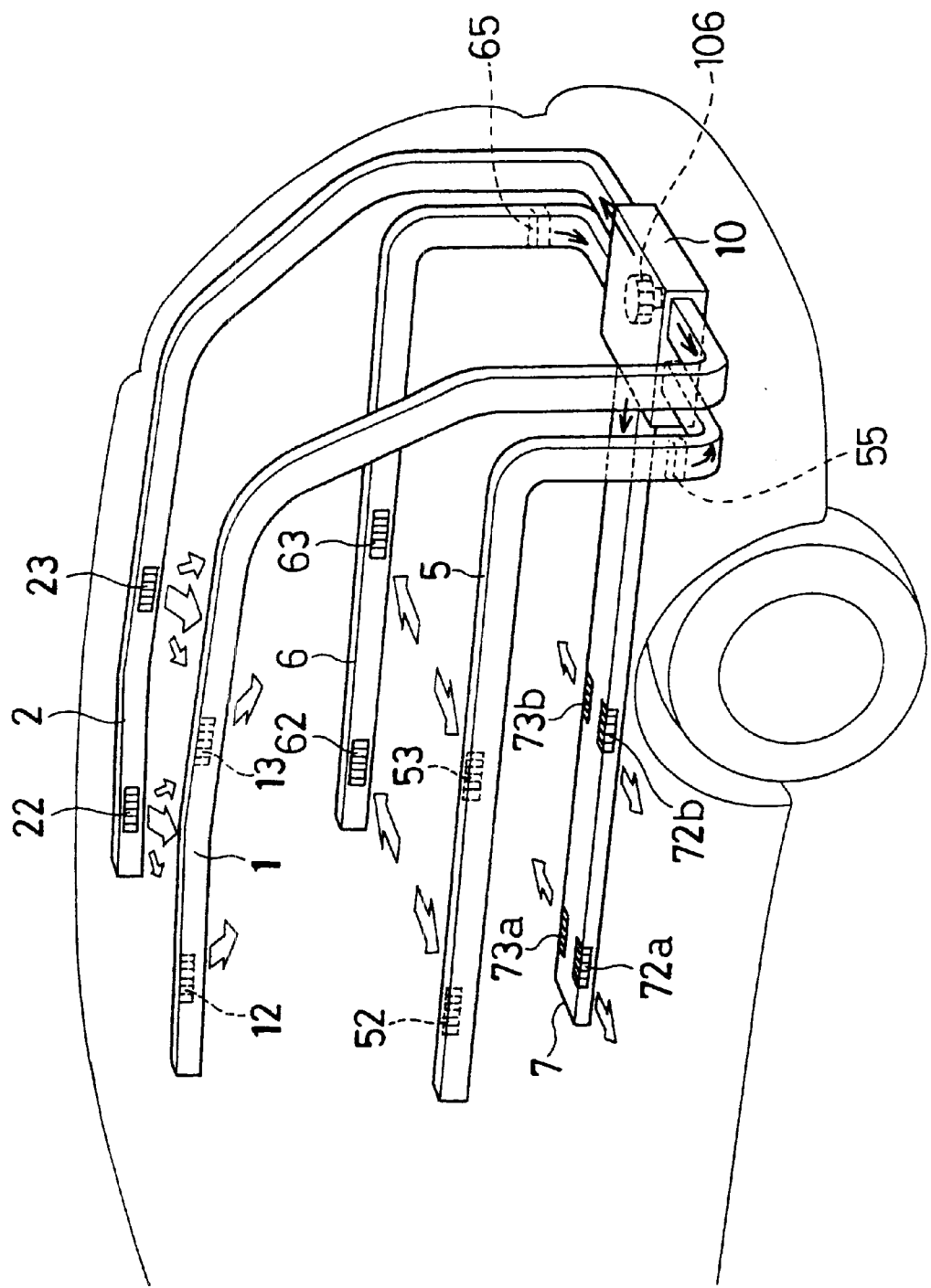
FIG. 10 is a perspective view showing the plural rear air suction ports and plural rear air outlets for the rear air conditioning unit, according to the fourth embodiment.

The rear air conditioning unit 10 has a structure similar to that of the above-described first embodiment (FIG. 2). As shown in FIGS. 9 and 10, in the fourth embodiment, similarly to the above-described first embodiment, the cool air outlets 12, 13 are provided in the downstream part of the left cool air duct 1 at both positions corresponding to the left sides (left seats) of the second and third seats S2, S3, and the cool air outlets 22, 23 are provided in the downstream part of the right cool air duct 2 at both positions corresponding to the right sides (right seat) of the second and third seats S2, S3. Further, plural louvers for changing air-blowing direction can be provided in each of the cool air outlets 12, 13, 22, 23.

Further, in the fourth embodiment, the single warm air duct 7 is provided at an approximate center in the width direction to extend from the rear air conditioning unit 10 toward the vehicle front side along the vehicle floor, similarly to the above-described second embodiment. Accordingly, the warm air outlets 72a, 73a for the left and right second seats and the warm air outlets 72a, 73b for the left and right third seats are provided in the warm air duct 7 to be opened toward right and left sides. Similarly to the above-described first embodiment, plural louvers can be provided in each of the warm air outlets 72a, 73a, 72b, 73b.

Further, at the downstream parts of the left and right inside air suction ports 5, 6, suction ports 52, 62 corresponding to the left and right second seats S2 and suction ports 53, 63 corresponding to the left and right third seats S3 are provided, respectively. The suction ports 52, 62, 53, 63 are opened in the left and right side panel portions between the cool air outlets 12, 13, 22, 23 and the warm air outlets 72a, 73a, 72b, 73b in the vehicle up-down direction.

In the fourth embodiment, inside suction ports 60 can be provided in entire areas of the downstream parts of the left and right inside air suction ducts 5, 6, as shown in FIG. 9. Further, forced suction blowers 55, 65 (forced suction member) such as centrifugal blowers and axial blowers for forcibly sucking inside air can be disposed at the downstream air sides of the suction ports 52, 53, 62, 63 in the left and right air suction ducts 5, 6, respectively, in addition to the rear blower 10b of the rear air conditioning unit 10. In this case, at least a part of forcibly sucked air can be introduced into the rear air conditioning unit 10.

In the fourth embodiment, when a face mode is set in the cooling operation, the left and right front face outlets, and the cool air outlets 12, 22, 13, 23 are opened by a first mode switching door (not shown), so that conditioned cool air is blown toward the upper side of each seat from the left and right front face outlets and the cool air outlets 12, 22, 13, 23.

On the other hand, when a foot mode is set in the heating operation, the left and right front foot air outlets and the warm air outlets 72a, 72b, 73a, 73b are opened by a second air outlet mode switching door (not shown), so that conditioned warm air is blown toward the lower side of each seat in the passenger compartment from the left and right front foot air outlets, the warm air outlets 72a, 72b, 73a, 73b.

FIG. 11 is a view showing an experimental result regarding the mean air temperature of the upper body of a passenger on the second or third seat and an air amount blown toward the front seat (first seat), and FIG. 12 is a view showing an another experimental result regarding the air temperature of the face of the passenger on the second or third seat and the air amount blown toward the front seat (first seat). In the experiments of FIGS. 11 and 12, the outside air temperature is 30° C., the sunlight amount entering into the passenger compartment is zero, the air temperature blown toward the left side (driver's seat side) of the second or third seat is 11° C., and the air temperature blown toward the right side (front passenger's seat side) is 26° C.

In FIG. 11, graph P1 indicates the mean air temperature of the passenger's upper body on each of the second and third seat at the right side (front passenger's seat side) when the suction ports are provided respectively for the second and third seats, graph P2 indicates the mean air temperature of the passenger's upper body on each of the second and third seats at the right side (front passenger's seat side) when a single suction port is provided at one position, graph D1 indicates the mean temperature of the passenger's upper body on each of the second and third seats at the left side (driver's seat side) when the suction ports are provided, respectively, for the second and third seats, and graph D2 indicates the mean temperature of the passenger's upper body on each of the second and third seats at the left side (driver's seat side) when the single suction port is provided.

According to the experiment of FIG. 12, in an area of the air amount blown toward the front seat (first seat), larger than 30 m$^3$/h, an air flow from the outlets toward the second and third seats readily becomes unfavorable. Here, the air amount of 30 m$^3$/h corresponds to an air flow speed of 0.5 m/h. According to the experiments, an unfavorable feeling can be also changed in accordance with the air temperature blown into the passenger compartment. Accordingly, in the fourth embodiment, using the forced suction member such as the blowers 55, 65, the independent temperature control can be readily obtained in each seat while the air amount blown into the passenger compartment is controlled at an upper limit value without giving an unpleasant feeling.

Figure 13C:
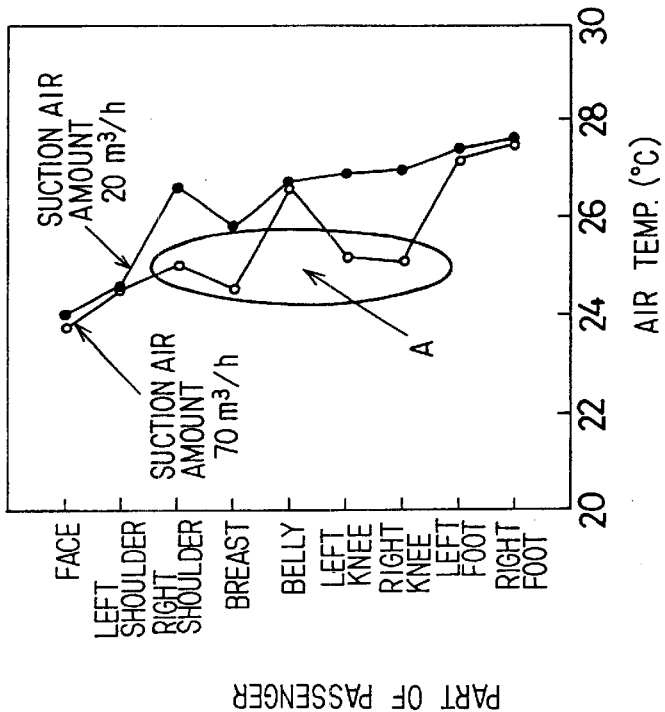
FIG. 13C is a view showing a temperature distribution in each part of a passenger when the air amount sucked into the inside air suction port is 20 m$^3$/h and 70 m$^3$/h, according to the fourth embodiment.
Figure 13A:
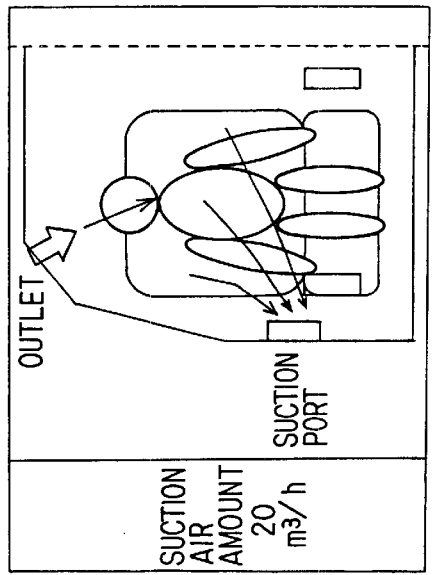
FIGS. 13A and 13B are views for explaining an air flow from a cool air outlet to an inside air suction port when an air amount sucked into the inside air suction port is 20 m$^3$/h and 70 m$^3$/h, respectively.
Figure 13B:
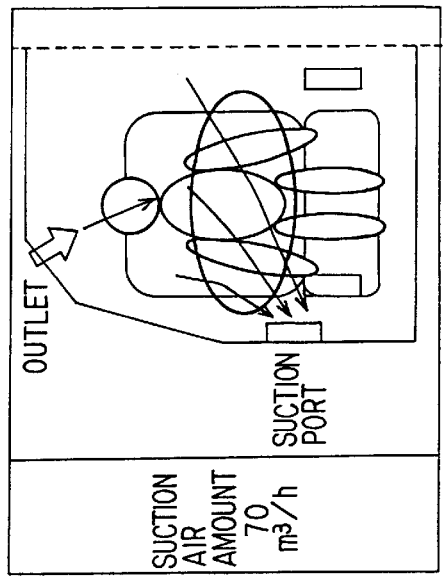

In the experiments of FIGS. 13A–13B, the outside air temperature is 30° C., the sunlight amount entering into the passenger compartment is zero. Further, FIG. 13A shows a simulation when the suction air amount is 20 m$^3$/h, and FIG. 13B shows a simulation when the suction air amount is 70 m$^3$/h. As shown in FIG. 13C, when the suction amount of cool air is increased to 70 m$^3$/h using the forced air suction member 55, 65 in the cooling operation, the air temperature in the area A including the positions between the breast and the knee, shown in FIG. 13C, is decreased. Accordingly, in the cooling operation (face mode), by increasing the air suction amount to be larger than a predetermined amount, the air flow from an air outlet to a suction port corresponding to the air outlet can be increased, and air conditioning performance can be improved. On the other hand, in the heating operation (foot mode), the air suction amount is set lower than the predetermined amount, so that air-conditioning feeling is improved.

A fifth preferred embodiment of the present invention will be now described with reference to FIG. 14. As shown in FIG. 14, in the fifth embodiment, the left and right warm air duct 3, 4 are disposed to extend along the side panel portions toward the vehicle front side on the vehicle floor so that warm air is blown toward the foot area of the passenger seated on each of the second and third seats through the warm air ducts 3, 4, similarly to the above-described first embodiment. In the fifth embodiment, similarly to the above-described fifth embodiment, the warm air outlets 32, 42, from which air is blown toward the left and right sides of the second seat, are provided at positions corresponding to the left and right second seats in the left and right warm air ducts 3, 4, and the warm air outlets 33, 43, from which air is blown toward the left and right sides of the third seat, are provided at positions corresponding to the left and right third seats in the left and right warm air ducts 3, 4. Further, the warm air outlets 32, 42 are provided to be opened toward the left and right foot areas of the second seat, and the warm air outlets 33, 43 are provided to be opened toward the left and right foot areas of the third seat.

In the fifth embodiment, a single inside air suction duct 100 is disposed on the vehicle floor between right and left seats at an approximate center in the width direction to extend from the rear air conditioning unit 10 toward the vehicle front side. Inside air suction ports 112, 122 are provided in the inside air suction duct 100 to be opened toward left and right second seats, and inside air suction ports 113, 123 are provided in the inside air suction duct 100 to be opened toward the left and right third seats. Further, a forced suction blower 115 (forced suction member) for forcibly sucking inside air from the inside air suction ports 112, 122, 113, 123 can be provided in the inside air suction duct 100 at a downstream air side of the inside air suction ports 112, 122, 113, 123, in addition to the blower 10b of the rear air conditioning unit 10. In this case, the inside air suction effect can be improved, and the air-conditioning performance for the second seat and the third seat of the passenger compartment can be improved.

Figure 15:
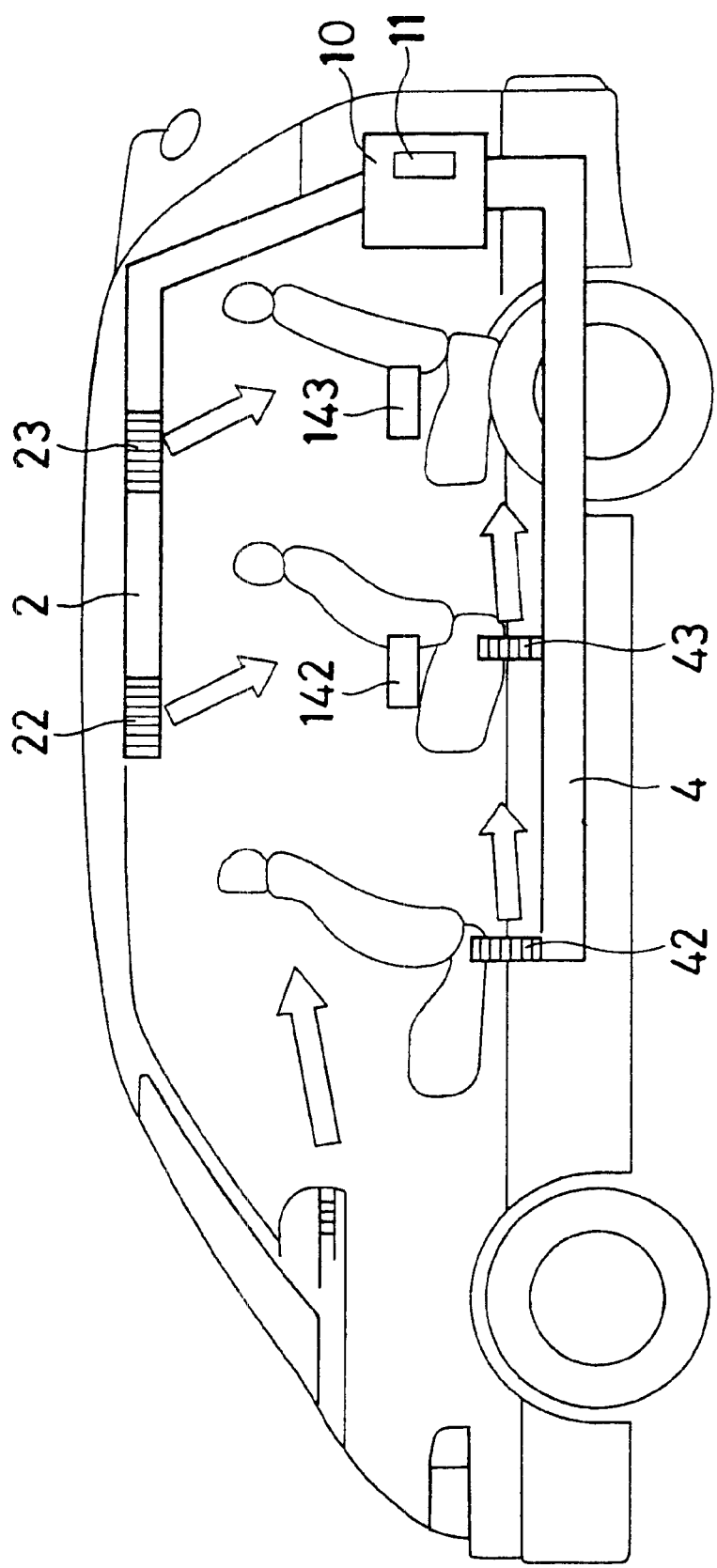
FIG. 15 is a schematic side view showing a main part of a rear air conditioning unit, according to a sixth preferred embodiment of the present invention.
Figure 16:
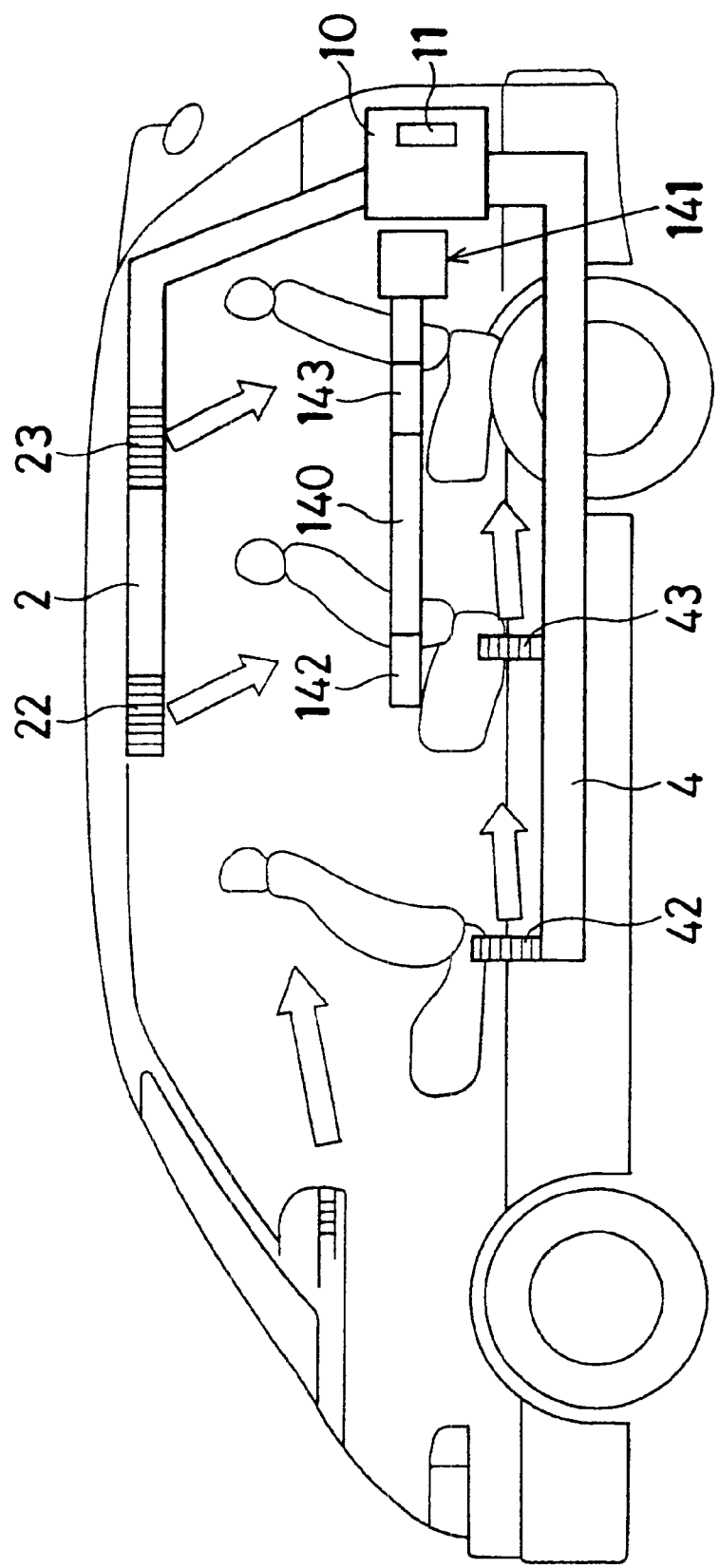
FIG. 16 is a schematic side view showing a separated air suction duct separated from the rear air conditioning unit, according to the sixth embodiment of the present invention.

A sixth preferred embodiment of the present invention will be now described with reference to FIGS. 15 and 16. In the sixth embodiment, as shown in FIGS. 15 and 16, an inside air suction port 142 is provided at a position corresponding to the second seat in a separated inside air suction duct 140 which is formed separately from the rear air conditioning unit 10, and an inside air suction port 143 is provided at a position corresponding to the third seat in the separated inside air suction duct 140. Further, a forced suction member 141 such as a centrifugal blower and an axial blower can be disposed in the separated suction duct at a downstream air side of the air suction ports 142, 143. Inside air sucked from the suction ports 142, 143 by the forced suction member is blown toward a suction port 11 provided at an upstream air side of the air duct 10a of the rear air conditioning unit 10 through a communication duct or the interior of the passenger compartment or the like. In the sixth embodiment, the forced suction member 141 is a centrifugal blower having a centrifugal fan and a blower motor such as an actuator for rotating the centrifugal fan.

Inside air sucked from the suction ports 142, 143 by the forced suction member 141 is blown toward the suction port 11 provided at an upstream air side of the air duct 10a of the rear air conditioning unit 10 through a communication duct or the like. Therefore, the forced suction member 141 can be disposed in the communication duct. In the sixth embodiment, the other parts are similar to those of the above-described first embodiment. Accordingly, in the sixth embodiment, even when a seat movable range is larger in a one box car and any one of the second and third seats is at a position away from a cool air outlet or a warm air outlet, because the air-suction capacity from the inside air suction ports 142, 143 can be effectively improved due to the forced suction member, the air conditioning performance for the second and third seats can be improved without increasing the air amount blown from the cool air outlets or the warm air outlets. Thus, a favorable air-conditioning space can be provided around each passenger on each seat, an independent air-conditioning control performance for each seat can be improved, and consumed power can be reduced. Further, air-blowing noise can be reduced, and air-flow feeling for a passenger can be improved.

In the rear air conditioning unit 10 of the sixth embodiment, an air outlet mode can be automatically switched between a face mode where cool air is blown from the cool air outlets, a foot mode where warm air is blown from the warm air outlets, and a bi-level mode where cool air and warm air are blown from the cool air outlets and the warm air outlets. That is, any one of the face mode, the foot mode and the bi-level mode can be selectively set in accordance with a target air temperature (TAO) calculated in an air conditioning ECU using a temperature difference between a set temperature and the inside air temperature, the outside air temperature and the sunlight amount entering into the passenger compartment. Alternatively, any one of the face mode, the bi-level mode and the foot mode can be switched in accordance with an operation state of a mode setting switch.

Further, the air conditioning ECU can control operation of the forced suction member 141 in accordance with a selected air outlet mode. That is, during the face mode, the air suction amount is controlled so that the air conditioning is performed without giving unfavorable air flow to the face of the passenger on the second or the third seat. On the other hand, during the foot mode, the air suction amount is controlled so that the air conditioning is performed without giving a hot felling to the face of the passenger. For example, during the face mode, the suction air amount is set to be in a range of 50–80 m$^3$/h by the forced air suction of the forced suction member. On the other hand, during the foot mode, the suction air amount is set to be in a range of 20–50 m$^3$/h by the forced air suction of the forced suction member.

In the sixth embodiment, because the forced suction member such as the forced suction blower 141, separated from the blower 10b of the rear air conditioning unit 10, is used, the suction air amount different from the air amount flowing in the rear air conditioning unit 10 can be readily set.

A seventh preferred embodiment of the present invention will be now described with reference to FIGS. 17 and 18. In the seventh embodiment, a vehicle air conditioner includes a front air conditioning unit (not shown) for performing air-conditioning operation of a passenger on a first seat (i.e., front seat) at the first seat line within a passenger compartment, a rear air conditioning unit 10 for performing air-conditioning operation of a passenger on a second seat (i.e., rear seat) at the second seat line within the passenger compartment and a passenger on a third seat (i.e., rear seat) at the third seat line within the passenger compartment, a seat air conditioning unit 200 for blowing conditioned air to a passenger on each seat from each seat, and a control unit for controlling components of the front air conditioning unit, the rear air conditioning unit 10 and the seat air conditioning unit 200. The seat air conditioning unit 200 is disposed at a downstream air side of the front air conditioning unit or the rear air conditioning unit 10 so that conditioned air from the front air conditioning unit or the rear air conditioning unit 10 is introduced into the seat air conditioning unit 200.

The seat air conditioning unit 200 includes a seat air duct 210 attached to each of left and right second seats and left and right third seats at a lower side of each seat, and a centrifugal seat blower 220 for generating an air flow toward a seat surface. The seat blower 220 is disposed in an air passage within the seat air duct 210. The seat air duct 210 of the seat air conditioning unit 200 is coupled with the front air conditioning unit or the air duct 10a (see FIG. 2) of the rear air conditioning unit 10, through a communication air duct 230.

Figure 17:
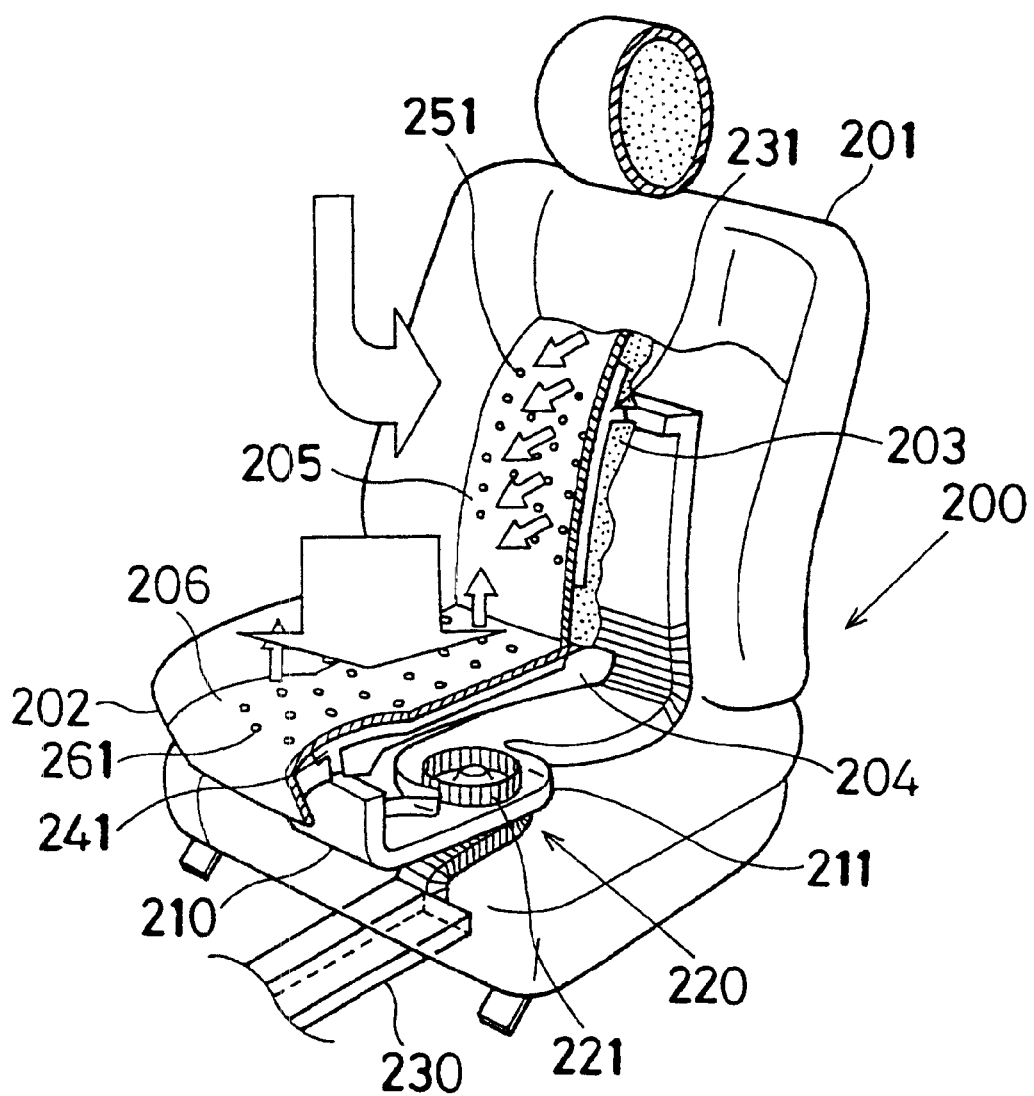
FIG. 17 is a schematic perspective view showing a structure of a seat air conditioning unit according to a seventh preferred embodiment of the present invention.

Each seat of the second and third seats in the passenger compartment is composed of a seat back 201 and a seat cushion 202, as shown in FIG. 17. Further, in each of the seat back 201 and the seat cushion 202, urethane pads 203, 204 are covered by outer layers 205, 206, respectively. Air passages 231, 241, through which conditioned air blown by the seat blower 220 flows to the seat surfaces, are provided in the urethane pads 203, 204 of the seat back 201 and the seat cushion 202. When the outer layers 205, 206 are made of a leather, for example, plural holes 251, 261 are opened in the outer layers 205, 206. However, when the outer layers 205, 206 are made of a material having a sufficient air permeability, it is unnecessary to provide the holes 251, 261.

The centrifugal seat blower 220 includes a blower case 211 formed integrally with the seat air duct 210, a centrifugal fan 221 accommodated in the blower case 211, and a blower motor 222 rotating and driving the centrifugal fan 221. When the blower motor 222 is driven to rotate the centrifugal fan 221, conditioned air from the front air conditioning unit or the rear air conditioning unit 10 is forcibly blown into the seat air passage within the seat air duct 210 through the communication air duct 230.

Figure 18:
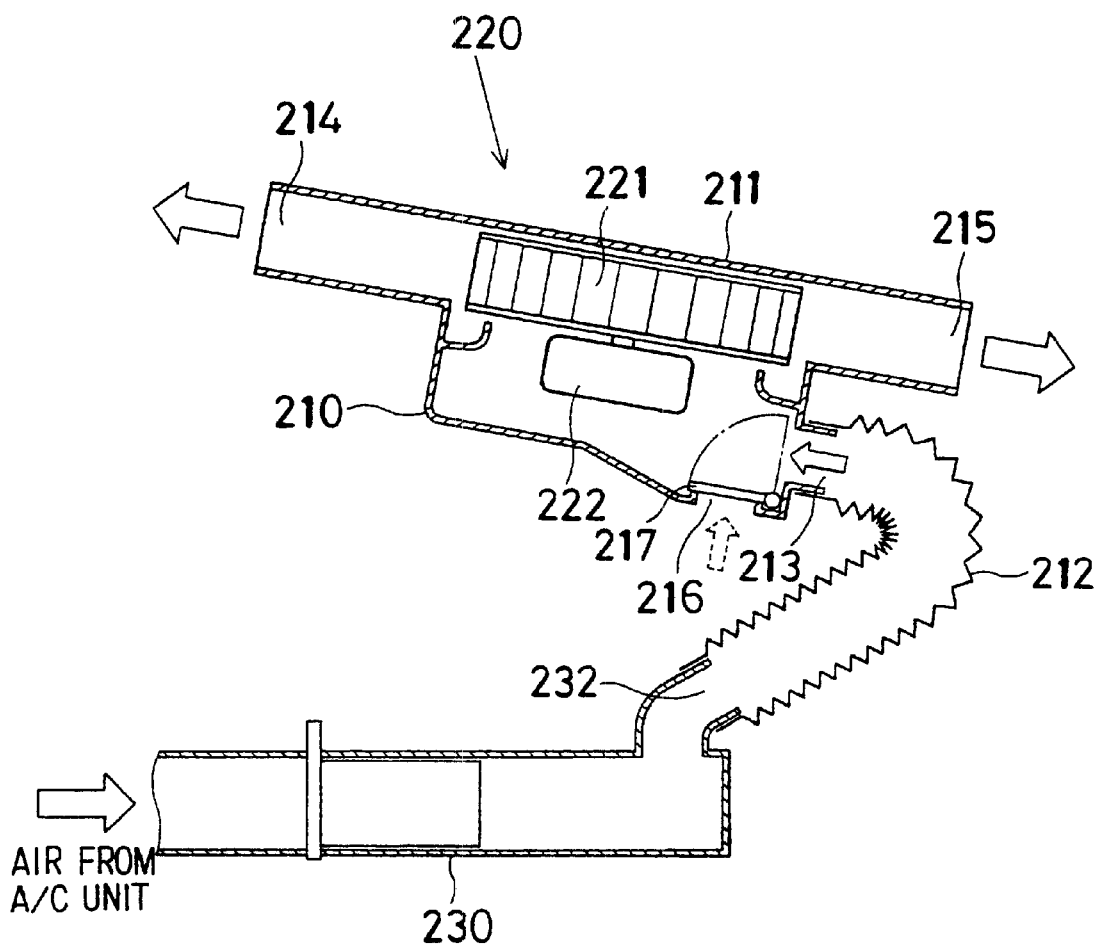
FIG. 18 is a schematic sectional view showing a main part of the seat air conditioning unit according to the seventh embodiment.

In the seventh embodiment, as shown in FIG. 18, the seat air duct 210 has an air suction port 213 communicating with a connection port 232 of the communication air duct 230 through a flexible duct 212, a first air outlet 214 communicating with the air passage of the seat back 201, a second air outlet 215 communicating with the air passage 241 of the seat cushion 202, and an inside air suction port 216 provided to communicate with the passenger compartment. Further, a suction port switching door 217, which selectively opens and closes the conditioned air suction port 213 and the inside air suction port 216 is disposed. When the switching door 217 is operated to open the inside air suction port 216, and when the centrifugal fan 221 is rotated by the blower motor 222, the centrifugal seat blower 220 can be used as a forced suction blower.

Although the present invention has been fully described in connection with the preferred embodiments thereof with reference to the accompanying drawings, it is to be noted that various changes and modifications will become apparent to those skilled in the art.

For example, in the above-described embodiments, the rear air conditioning unit 10 is disposed on the vehicle floor at a rear side of the third seat S3 within the passenger compartment. However, the rear air conditioning unit 10 may be provided in the side panel, or may be provided in a recess that is provided in the vehicle floor similarly to a tire house. Further, the rear air conditioning unit 10 may be mounted in the ceiling or under the vehicle floor.

In the above-described first embodiment, the air blowing amount is adjusted using the plural air amount adjustment doors 14, 15, 24, 25, 34, 35, 44, 45 and the suction air amount is adjusted using the plural air adjustment doors 54, 55, 64, 65. However, the air amount blown from both air outlets or plural air outlets may be adjusted using a single door, or may be adjusted using a door provided in the rear air conditioning unit 10.

In the above-described first embodiment, each of the left and right cool air ducts 1, 2, and the left and right warm air ducts 3, 4 is disposed to extend from the rear air conditioning unit 10 toward the vehicle front side by a single duct. However, plural left and right cool air ducts and plural left and right warm air ducts may be provided.

In the above-described first embodiment, the inside air suction ducts 5, 6 are disposed to be directly connected to the rear air conditioning unit 10. However, the suction ducts 5, 6 can be coupled to the rear air conditioning unit 10 or the front air conditioning unit through a communication duct. In this case, a forced suction member such as a forced suction blower may be disposed in the communication duct.

In the above-described first embodiment, conditioned air from the rear air conditioning unit 10 is supplied to the cool air outlets 12, 13, 22, 23 and the warm air outlets 32, 33, 44, 45. However, conditioned air from the front air conditioning unit (not shown) can be supplied to the cool air outlets 12, 13, 22, 23 and the warm air outlets 32, 33, 44, 45 which are provided for the right and left seats in each of the second and third seats S2, S3, respectively. In this case, the front air conditioning unit independently controls air conditioning states of right and left front seats positioned at a first seat line in the passenger compartment.

In the above-described embodiment, the structure of the rear air conditioning unit 10 shown in FIG. 2 and the structure of the front air conditioning unit can be changed.

In the above-described fourth and fifth embodiments, the forced suction blower 55, 65, 115 is disposed in each suction air duct 5, 6, 100. However, plural forced suction members for forcibly sucking inside air can be disposed at plural positions, respectively, for each seat.

Such changes and modifications are to be understood as being within the scope of the present invention as defined by the appended claims.

What is claim is:

1. An air conditioner for a vehicle including a plurality of seats arranged at least in two rows in a passenger compartment in a vehicle front-rear direction, the passenger compartment having therein at least right and left two seats in each row to have at least four independent air-conditioning spaces for the seats at right and left sides in each row, the air conditioner comprising:
    an air conditioning unit including:
        an air conditioning duct defining an air passage through which air flows, and
        a unit blower which generates an air flow toward the passenger compartment, in the air passage of the air conditioning duct; wherein:
        the air conditioning duct has a first outlet passage provided in a ceiling portion of the vehicle to extend in the vehicle front-rear direction at a vehicle left side near to a center in a vehicle right-left direction such that the first outlet passage crosses with the rows, a second outlet passage provided in the ceiling portion of the vehicle to extend in the vehicle front-rear direction at a vehicle right side near to the center in the vehicle right-left direction such that the second outlet passage crosses with the rows, a first suction passage extending in the vehicle front-rear direction at a vehicle left side to cross with the rows, and a second suction passage extending in the vehicle front-rear direction at a vehicle right side to cross with the rows;
        the unit blower is disposed for blowing air at least into the first and second outlet passages and for sucking air inside the passenger compartment from the first and second suction passages;
        the first and second suction passages have at least four suction ports from which air is sucked, at each position approximately corresponding to the waist part of a passenger in a vehicle up-down direction when the passenger is seated on one of the seats; and the first and second outlet passages have at least four outlet ports for respectively independently blowing air toward the at least four air-conditioning spaces.

2. The air conditioner according to claim 1, wherein the air conditioning unit has an air-conditioning member which is disposed to independently adjust any one of a suction air amount sucked from each suction port, an air-blowing amount blowing from each outlet, an air temperature blowing from each outlet, and an air outlet mode for changing an air flowing direction toward each air-conditioning space of the seats.

3. The air conditioner according to claim 1, wherein the air conditioning unit is a front air conditioning unit having a front air-conditioning member which independently controls air conditioning states of right and left front seats positioned at a most front seat row in the passenger compartment.

4. The air conditioner according to claim 1, wherein the air conditioning unit is a rear air conditioning unit having a rear air-conditioning member which independently controls air conditioning states of right and left seats of at least one of rear seats positioned at a second seat row and a seat row rear from the second seat row in the passenger compartment.

5. The air conditioner according to claim 1, wherein the suction ports are provided to be opened toward the corresponding seats, respectively.

6. The air conditioner according to claim 1, wherein: each of the outlets includes
a cool air outlet portion, provided at an upper side in the passenger compartment, from which cool air is mainly blown toward an upper side of the air conditioning space of a corresponding seat, and
a warm air outlet portion, provided at a lower side in the passenger compartment, from which warm air is mainly blown toward a lower side of the air conditioning space of the corresponding seat; and
each suction port is provided between the cool air outlet portion and the warm air outlet portion of each air outlet in a vehicle up-down direction.

7. The air conditioner according to claim 6, wherein:
each cool air outlet portion of the outlets is provided for each air-conditioning space of the seats at a position around a vehicle ceiling; and
each warm air outlet portion of the outlets is provided for each air-conditioning space of the seats at a position around a vehicle floor.

8. The air conditioner according to claim 1, wherein each suction port is provided around at a position approximately corresponding to the waist part of a passenger in a vehicle up-down direction, when a passenger is seated on one of the seats.

9. The air conditioner according to claim 1, wherein each suction port is provided in one of a side door and a side panel of the vehicle.

10. The air conditioner according to claim 1, further comprising
a forced suction member for forcibly sucking air inside the passenger compartment from the suction ports into the air passage of the air conditioning duct, the forced suction member being disposed separately from the unit blower.

11. The air conditioner according to claim 10, further comprising:
a seat air duct through which air from the air conditioning unit and air from the passenger compartment are selectively introduced into each of the seats, wherein:
the seat air duct is disposed to be integrated with each of the seats; and
the forced suction member is a seat blower which is disposed in the seat air duct so that air introduced into the seat air duct is blown from a seat surface.

12. The air conditioner according to claim 10, wherein the forced suction member is a forced suction blower which forcibly sucks air inside the passenger compartment and generates an air flow toward into the air passage of the air conditioning duct.

13. The air conditioner according to claim 12, wherein:
the air conditioning unit includes a communication duct through which the suction ports communicate with an upstream air side of the air passage of the air conditioning duct; and
the forced suction blower is disposed in the communication duct.

14. The air conditioner according to claim 12, further comprising
a blower control unit which controls operation of the forced suction blower in accordance with one of each passenger's operation and a blower control characteristic,
wherein the blower control unit controls an air amount sucked from each of the suction ports due to the operation of the forced suction member, in accordance with at least one of an air temperature and an air amount blown from an air outlet which is selected from a passenger's seated position.

15. The air conditioner according to claim 12, further comprising
a blower control unit which controls operation of the forced suction blower in accordance with one of each passenger's operation and a blower control characteristic, wherein:
the blower control unit controls an air amount sucked from the suction ports to become larger than a predetermined amount in an air outlet mode where air is mainly blown toward an upper side of each seat; and
the blower control unit controls an air amount sucked from the suction ports to become smaller than the predetermined amount in an air outlet mode where air is mainly blown toward a lower side of each seat.

16. The air conditioner according to claim 12, wherein:
the air conditioning unit is a rear air conditioning unit which is constructed to independently control air-conditioning states of right and left seats in each seat line which is rear from a most front seat line; and
the forced suction blower has an air discharge port from which air inside the passenger compartment sucked by the forced suction blower is blown toward an air suction port provided at an upstream air end of the air conditioning duct.

17. The air conditioner according to claim 1, wherein the first and second suction passages are provided at a position upper than each seat cushion of the seats by a predetermined distance.

18. The air conditioner according to claim 1, wherein:
each of the first and second suction passages is disposed between right and left seats of at least two rear seat rows rear from a most front seat row in the passenger compartment; and the air conditioning unit is a rear air conditioning unit for controlling air-conditioning states of the right and left seats in each rear seat row.

19. The air conditioner according to claim 1, wherein:

the first and second suction passages are provided at a right side of each right seat and a left side of each left seat, respectively, in each rear seat row rear from a most front seat row in the passenger compartment; and the air conditioning unit is a rear air conditioning unit for controlling air-conditioning states of the right and left seats in each rear seat row.

20. The air conditioner according to claim 1, wherein the first and second suction passages are provided such that at least a part of air from the first and second suction passages is introduced into the air conditioning duct.

21. The air conditioner according to claim 1, further comprising:

a plurality of forced suction members for forcibly sucking air inside the passenger compartment from the suction ports, wherein each of the forced suction member is disposed in each of the first and second suction passages at a downstream air side of each of the suction ports.

22. The air conditioner according to claim 1, further comprising:

a forced suction member for forcibly sucking air inside the passenger compartment from the suction ports, wherein the forced suction member is disposed in a communication duct through which the first and second suction passages communicate with an air suction side of the unit blower.

23. The air conditioner according to claim 1, wherein:

the unit blower is disposed for blowing air at least into the first and second outlet passages and for sucking air from the first and second suction passages;

the suction ports are provided such that at least a part of air blown from any one outlet port is sucked into one suction port nearest to the one outlet port.

24. The air conditioner according to claim 1, wherein:

the air conditioning duct further has a third outlet passage provided in a floor portion of the vehicle to extend in the vehicle front-rear direction at a vehicle left side near to the center in the vehicle right-left direction such that the third outlet passage crosses with the rows, and a fourth outlet passage provided in the floor portion to extend in the vehicle front-rear direction at a vehicle right side near the center in the vehicle right-left direction such that the fourth outlet passage crosses with the rows; and the third and fourth outlet passages have at least four outlet ports for respectively independently blowing air toward the at least four air-conditioning spaces.

25. The air conditioner according to claim 24, wherein:

the blower is disposed to blow cool air into the first and second outlet passages and to blow warm air into the third and fourth outlet passages; and the suction ports are provided such that at least a part of air blown from any one outlet port is sucked into one suction port nearest to the one outlet port.

26. An air conditioner for a vehicle having a plurality of seats in a passenger compartment, the air conditioner comprising:

an air conditioning unit including:

an air conditioning duct defining an air passage through which air flows;

a unit blower which generates an air flow toward the passenger compartment, in the air passage of the air conditioning duct;

a plurality of suction ports, each of which is provided for each of the seats, from which air inside the passenger compartment is sucked to be introduced into the air passage of the air conditioning duct;

a plurality of outlets, each of which is provided for each air-conditioning space of the seats in the passenger compartment, from which air from the air passage of the air conditioning duct is blown toward each air-conditioning space of the seats; and plural forced suction members each of which is disposed at a downstream air side of each suction port for each seat for forcibly sucking air inside the passenger compartment from each suction port into the air passage of the air conditioning duct, each forced suction member being disposed separately from the unit blower.

27. The air conditioner according to claim 26, further comprising:

a seat air duct through which air from the air conditioning unit and air from the passenger compartment are selectively introduced into each of the seats, wherein:

the seat air duct is disposed to be integrated with each of the seats; and the forced suction member is a seat blower which is disposed in the seat air duct so that air introduced into the seat air duct is blown from a seat surface.

28. The air conditioner according to claim 26, wherein the forced suction member is a forced suction blower which forcibly sucks air inside the passenger compartment and generates an air flow toward into the air passage of the air conditioning duct.

29. The air conditioner according to claim 28, wherein:

the air conditioning unit includes a communication duct through which the suction ports communicate with an upstream air side of the air passage of the air conditioning duct; and the forced suction blower is disposed in the communication duct.

30. The air conditioner according to claim 12, further comprising a blower control unit which controls operation of the forced suction blower in accordance with one of each passenger's operation and a blower control characteristic, wherein the blower control unit controls an air amount sucked from each of the suction ports due to the operation of the forced suction member, in accordance with at least one of an air temperature and an air amount blown from an air outlet which is selected from a passenger's seated position.

31. The air conditioner according to claim 28, further comprising a blower control unit which controls operation of the forced suction blower in accordance with one of each passenger's operation and a blower control characteristic, wherein:

the blower control unit controls an air amount sucked from the suction ports to become larger than a predetermined amount in an air outlet mode where air is mainly blown toward an upper side of each seat; and the blower control unit controls an air amount sucked from the suction ports to become smaller than the predetermined amount in an air outlet mode where air is mainly blown toward a lower side of each seat.

32. The air conditioner according to claim 28, wherein:

the air conditioning unit is a rear air conditioning unit which is constructed to independently control air-conditioning states of right and left seats in each seat line which is rear from a most front seat line; and the forced suction blower has an air discharge port from which air inside the passenger compartment sucked by the forced suction blower is blown toward an air suction port provided at an upstream air end of the air conditioning duct.

33. The air conditioner according to claim 26, wherein the forced suction member is disposed such that a part of air sucked from the forced suction member is introduced into the air passage within the air conditioning duct.

34. The air conditioner according to claim 26, wherein the forced suction member and the unit blower are disposed to be independently controlled.

35. The air conditioner according to claims 34, wherein the forced suction parts are disposed to be independently controlled.

36. An air conditioner for a vehicle including a plurality of seats arranged at least in two rows in a passenger compartment in a vehicle front-rear direction, the passenger compartment having therein at least right and left two seats in each row to have at least four independent air-conditioning spaces for the seats at right and left sides in each row, the air conditioner comprising:

an air conditioning duct defining an air passage through which air flows, and a unit blower which generates an air flow toward the passenger compartment, in the air passage of the air conditioning duct; wherein:

the air conditioning duct has a first outlet passage provided in a floor portion of the vehicle to extend in the vehicle front-rear direction at a vehicle left side near to a center in a vehicle right-left direction such that the first outlet passage crosses with the rows, a second outlet passage provided in the floor portion to extend in the vehicle front-rear direction at a vehicle right side near to the center in the vehicle right-left direction such that the second outlet passage crosses with the rows, a first suction passage extending in the vehicle front-rear direction at a vehicle left side to cross with the rows, and a second suction passage extending in the vehicle front-rear direction at a vehicle right side to cross with the rows;

the unit blower is disposed for blowing air at least into the first and second outlet passages and for sucking air inside the passenger compartment from the first and second suction passages;

the first and second suction passages have at least four suction ports from which air is sucked, at each position approximately corresponding to the waist part of a passenger in a vehicle up-down direction when the passenger is seated in one of the seats; and the first and second outlet passages have at least four outlet ports for respectively independently blowing air toward the at least four air-conditioning spaces.

37. The air conditioner according to claim 36, wherein:

the unit blower is disposed to blow air into the first and second outlet passages; and the suction ports are provided such that at least a part of air blown from any one outlet port is sucked into one suction port nearest to the one outlet port.

* * * * *